(12) United States Patent
Ohno

(10) Patent No.: US 10,250,854 B2
(45) Date of Patent: Apr. 2, 2019

(54) IMAGE PROJECTION APPARATUS, AND METHOD OF CONTROLLING IMAGE PROCESSING

(71) Applicant: Kouji Ohno, Chiba (JP)

(72) Inventor: Kouji Ohno, Chiba (JP)

(73) Assignee: Ricoh Company, Ltd., Tokyo (JP)

( * ) Notice: Subject to any disclaimer, the term of this patent is extended or adjusted under 35 U.S.C. 154(b) by 16 days.

(21) Appl. No.: 15/785,552

(22) Filed: Oct. 17, 2017

(65) Prior Publication Data

US 2018/0115753 A1 Apr. 26, 2018

(30) Foreign Application Priority Data

Oct. 24, 2016 (JP) .................................. 2016-207856

(51) Int. Cl.
| | |
|---|---|
| *H04N 5/64* | (2006.01) |
| *H04N 9/31* | (2006.01) |
| *G03B 21/00* | (2006.01) |
| *G09G 3/00* | (2006.01) |
| *G03B 5/00* | (2006.01) |

(52) U.S. Cl.
CPC .............. *H04N 9/312* (2013.01); *G03B 5/00* (2013.01); *G03B 21/006* (2013.01); *G09G 3/007* (2013.01); *G03B 21/008* (2013.01); *H04N 9/3144* (2013.01)

(58) Field of Classification Search
CPC ..................................................... H04N 9/312
See application file for complete search history.

(56) References Cited

U.S. PATENT DOCUMENTS

| | | | |
|---|---|---|---|
| 5,883,742 A | 3/1999 | Kamata | |
| 2005/0050569 A1 | 3/2005 | Yamanaka et al. | |
| 2005/0057726 A1* | 3/2005 | Uehara | G02B 27/1046 353/30 |
| 2006/0284495 A1 | 12/2006 | Seo et al. | |
| 2008/0273129 A1* | 11/2008 | Kurosawa | G09G 3/3614 349/37 |
| 2010/0033820 A1 | 2/2010 | Omi | |

(Continued)

FOREIGN PATENT DOCUMENTS

| | | |
|---|---|---|
| JP | 2001-350196 | 12/2001 |
| JP | 2008-070494 | 3/2008 |

(Continued)

*Primary Examiner* — Jefferey F Harold
*Assistant Examiner* — Humam M Satti
(74) *Attorney, Agent, or Firm* — Oblon, McClelland, Maier & Neustadt, L.L.P.

(57) ABSTRACT

An image projection apparatus includes an image generation element to generate an image using light emitted from a light source, a shift unit to shift a position of the image generation element with a given cycle, a projection control unit to control projection of the image under a plurality of modes, the modes including a first mode in which the image is projected without shifting the position of the image generation element by the shift unit, and a second mode in which the image is projected while shifting the position of the image generation element by the shift unit, and a detector to detect whether the image generation element operates normally. When the detector detects that the image generation element does not operate normally under the second mode, the projection control unit stops image processing being performed, and switches the second mode to the first mode.

9 Claims, 18 Drawing Sheets

(56) References Cited

U.S. PATENT DOCUMENTS

| | | |
|---|---|---|
| 2011/0019157 A1 | 1/2011 | He |
| 2011/0234650 A1* | 9/2011 | Watanabe .............. G09G 3/003 |
| | | 345/690 |
| 2014/0036239 A1 | 2/2014 | Mashitani |
| 2015/0219983 A1 | 8/2015 | Mashitani et al. |
| 2015/0264291 A1 | 9/2015 | Tani et al. |
| 2016/0154294 A1 | 6/2016 | Fujioka et al. |
| 2016/0198134 A1 | 7/2016 | Mikawa et al. |
| 2016/0277716 A1 | 9/2016 | Mikawa et al. |
| 2016/0286183 A1* | 9/2016 | Haraguchi ........... H04N 9/3111 |
| 2016/0366383 A1* | 12/2016 | Nishimori ............ H04N 9/3188 |
| 2017/0244940 A1 | 8/2017 | Mikawa et al. |
| 2018/0033357 A1* | 2/2018 | Li ........................... H04N 9/31 |

FOREIGN PATENT DOCUMENTS

| | | |
|---|---|---|
| JP | 2008-225158 | 9/2008 |
| JP | 2008-292647 | 12/2008 |
| JP | 2010-243686 | 10/2010 |
| JP | 2011-027821 | 2/2011 |
| JP | 2012-181386 | 9/2012 |
| JP | 2013-117629 | 6/2013 |
| JP | 2016-085363 | 5/2016 |
| JP | 2016-102945 | 6/2016 |
| JP | 2016-102946 | 6/2016 |
| WO | WO2016/067519 A1 | 5/2016 |

* cited by examiner

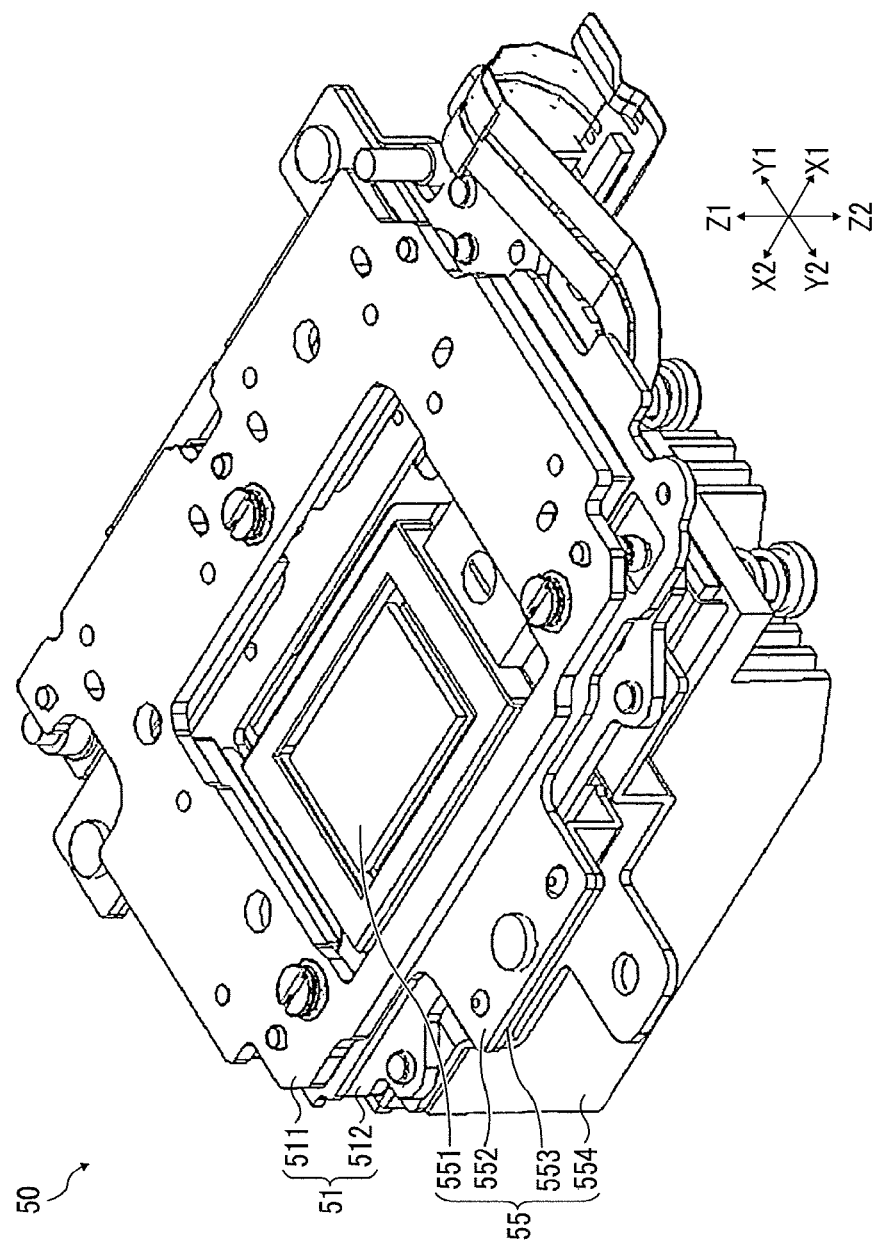

SHIFT PIXEL BY ONE-HALF
OF PIXEL (XL/2, YL/2)

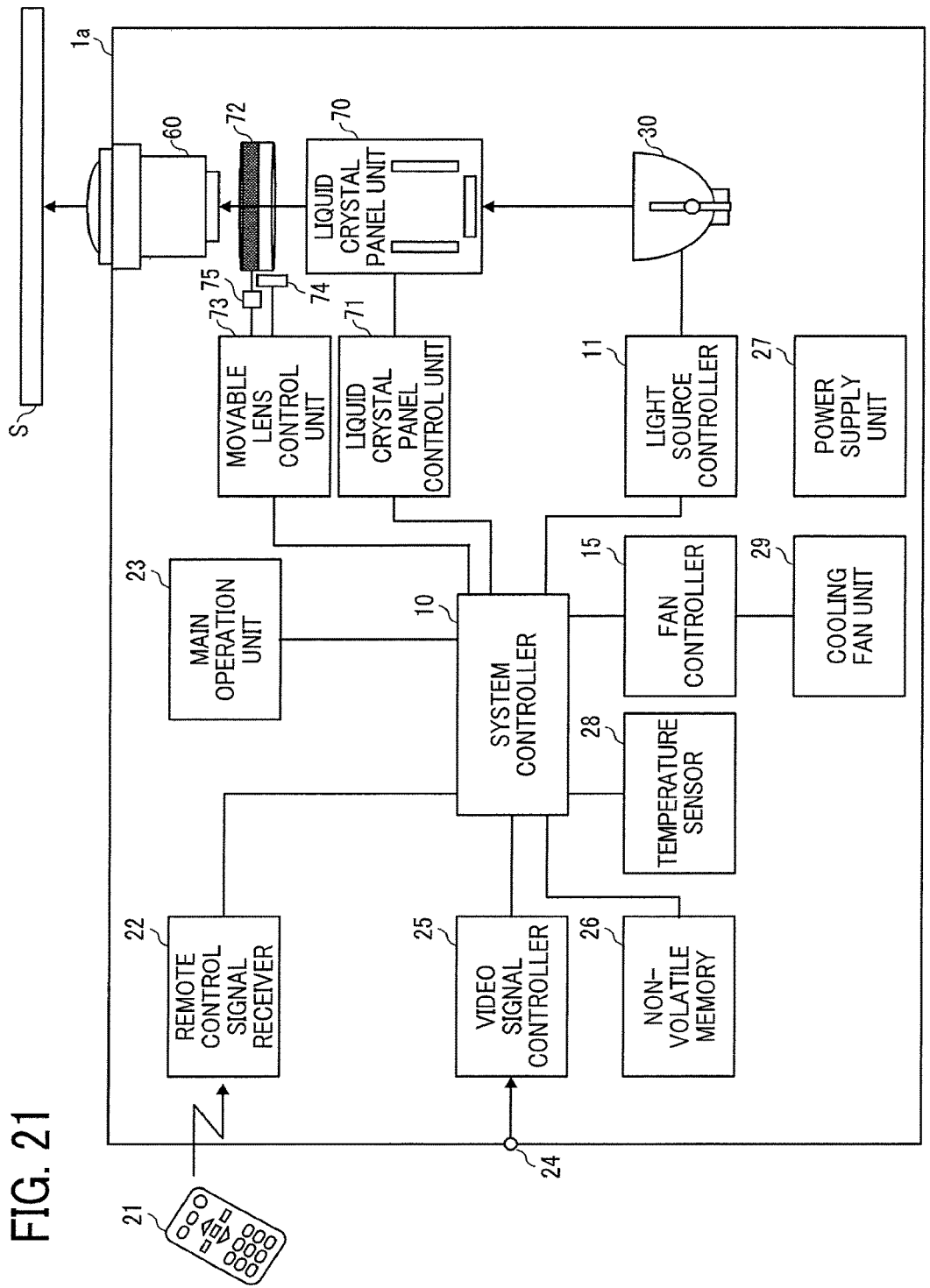

IMAGE PROJECTION APPARATUS, AND METHOD OF CONTROLLING IMAGE PROCESSING

CROSS-REFERENCE TO RELATED APPLICATION

This application claims priority pursuant to 35 U.S.C. § 119(a) to Japanese Patent Application No. 2016-207856, filed on Oct. 24, 2016 in the Japan Patent Office, the disclosure of which is incorporated by reference herein in its entirety.

BACKGROUND

Technical Field

This disclosure relates to an image projection apparatus, and a method of controlling image processing.

Background Art

Image projection apparatuses that project images on a projection face (e.g., screen) are used in a wide range of fields such as presentations to a large number of persons such as conferences, lecture meetings, educational sites, and home theaters. When the image projection apparatus receives image data transmitted from an information processing apparatus such as a personal computer, a video reproduction device such as a digital versatile disk (DVD) player, an imaging device such as a digital camera, an optical image generation element (or modulation element, image generation element) generates an image based on the received image data, and then the image is projected on a projection face (e.g., screen) through an optical system including a plurality of lenses or the like.

As to the image projection apparatuses widely used in presentations, conferences, lectures, meetings, educational institutions, movie viewing, and signage for a large number of people, image quality has been enhanced. The image quality projected by the image projection apparatuses can be increased by increasing the pixel density of the image generation element, but the manufacturing cost of the image generation element is increased.

SUMMARY

As one aspect of the present invention, an image projection apparatus is devised. The image projection apparatus includes an image generation element to generate an image using light emitted from a light source, a shift unit to shift a position of the image generation element with a given cycle, a projection control unit to control projection of the image under a plurality of modes, the modes including a first mode in which the image is projected without shifting the position of the image generation element by the shift unit, and a second mode in which the image is projected while shifting the position of the image generation element by the shift unit, and a detector to detect whether the image generation element operates normally. When the detector detects that the image generation element does not operate normally under the second mode, the projection control unit stops image processing being performed, and switches the second mode to the first mode.

As another aspect of the present invention, an image projection apparatus is devised. The image projection apparatus includes an image generation element to generate an image using light emitted from a light source, an optical element disposed at a position after the image generation element in a light path of the light emitted from the light source, a shift unit to shift the position of the optical element with a given cycle, a projection control unit to control projection of the image under a plurality of modes, the modes including a first mode in which the image is projected without shifting the position of the optical element by the shift unit, and a second mode in which the image is projected while shifting the position of the optical element by the shift unit, and a detector to detect whether the optical element operates normally. When the detector detects that the optical element does not operate normally under the second mode, the projection control unit stops image processing being performed, and switches the second mode to the first mode.

As another aspect of the present invention, a method of controlling image processing is devised. The method includes shifting a position of an image generation element of an image projection apparatus, the image generation element generating an image using light emitted from a light source with a given cycle, controlling projection of the image under a plurality of modes, the modes including a first mode in which the image is projected without shifting the position of the image generation element, and a second mode in which the image is projected while shifting the position of the image generation element, detecting whether the image generation element operates normally, stopping image processing being performed under processing the second mode when the detecting step detects that the image generation element does not operate normally under the second mode; and switching the second mode to the first mode after stopping the image processing performed under the second mode.

BRIEF DESCRIPTION OF THE DRAWINGS

A more complete appreciation of the description and many of the attendant advantages and features thereof can be readily obtained and understood from the following detailed description with reference to the accompanying drawings, wherein:

FIG. 6 is a perspective view of an image generation unit according to the embodiment;

FIG. 21 is a functional block diagram illustrating an example of an image projection apparatus according to a second embodiment.

Figure 1:
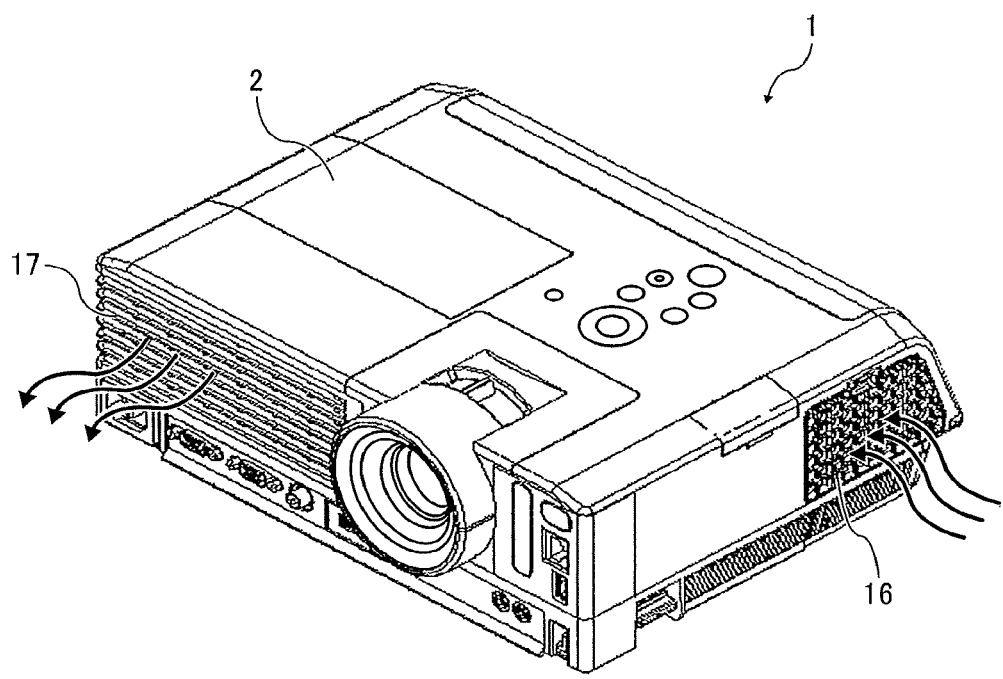
FIG. 1 is a perspective view of an image projection apparatus of an embodiment of the present invention.

The accompanying drawings are intended to depict exemplary embodiments of the present invention and should not be interpreted to limit the scope thereof. The accompanying drawings are not to be considered as drawn to scale unless explicitly noted, and identical or similar reference numerals designate identical or similar components throughout the several views.

DETAILED DESCRIPTION

A description is now given of exemplary embodiments of present disclosure. It should be noted that although such terms as first, second, etc. may be used herein to describe various elements, components, regions, layers and/or sections, it should be understood that such elements, components, regions, layers and/or sections are not limited thereby because such terms are relative, that is, used only to distinguish one element, component, region, layer or section from another region, layer or section. Thus, for example, a first element, component, region, layer or section discussed below could be termed a second element, component, region, layer or section without departing from the teachings of present disclosure.

In addition, it should be noted that the terminology used herein is for the purpose of describing particular embodiments only and is not intended to be limiting of present disclosure. Thus, for example, as used herein, the singular forms "a", "an" and "the" are intended to include the plural forms as well, unless the context clearly indicates otherwise. Moreover, the terms "includes" and/or "including", when used in this specification, specify the presence of stated features, integers, steps, operations, elements, and/or components, but do not preclude the presence or addition of one or more other features, integers, steps, operations, elements, components, and/or groups thereof. Furthermore, although in describing views illustrated in the drawings, specific terminology is employed for the sake of clarity, the present disclosure is not limited to the specific terminology so selected and it is to be understood that each specific element includes all technical equivalents that operate in a similar manner and achieve a similar result. Referring now to the drawings, one or more apparatuses or systems according to one or more embodiments are described hereinafter.

Hereinafter, a description is given of one or more embodiments of the present disclosure with reference to drawings of FIGS. 1 to 21.

(First Embodiment)
(Image Projection Apparatus)

Figure 2:
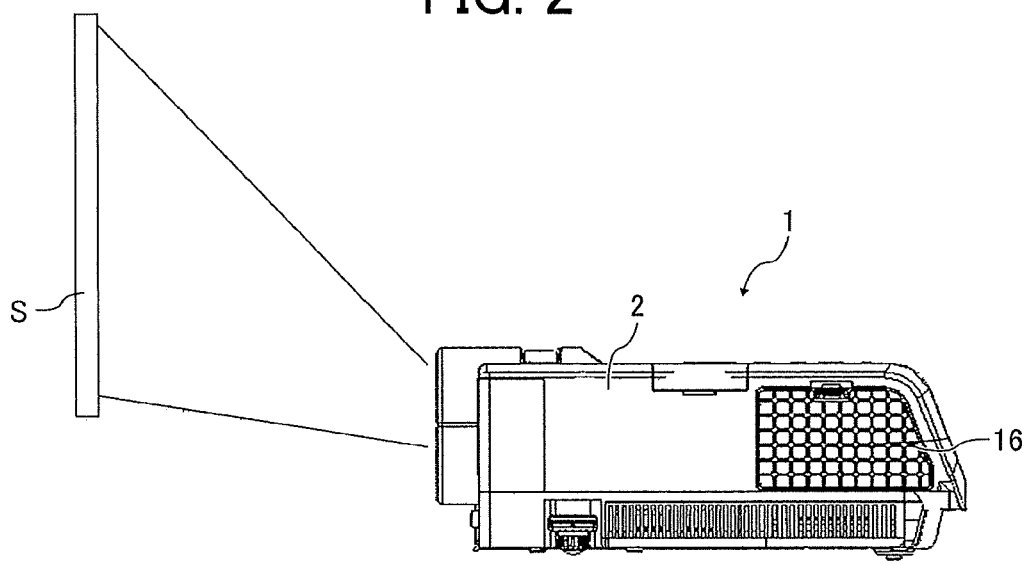
FIG. 2 is a side view of the image projection apparatus of FIG. 1, and the image projection apparatus projects an image on a screen used as a projection face.

FIG. 1 is a perspective view of an image projection apparatus 1 of an embodiment of the present invention. FIG. 2 is a side view of the image projection apparatus 1, and the image projection apparatus 1 projects an image on a screen S used as a projection face.

Figure 3A:
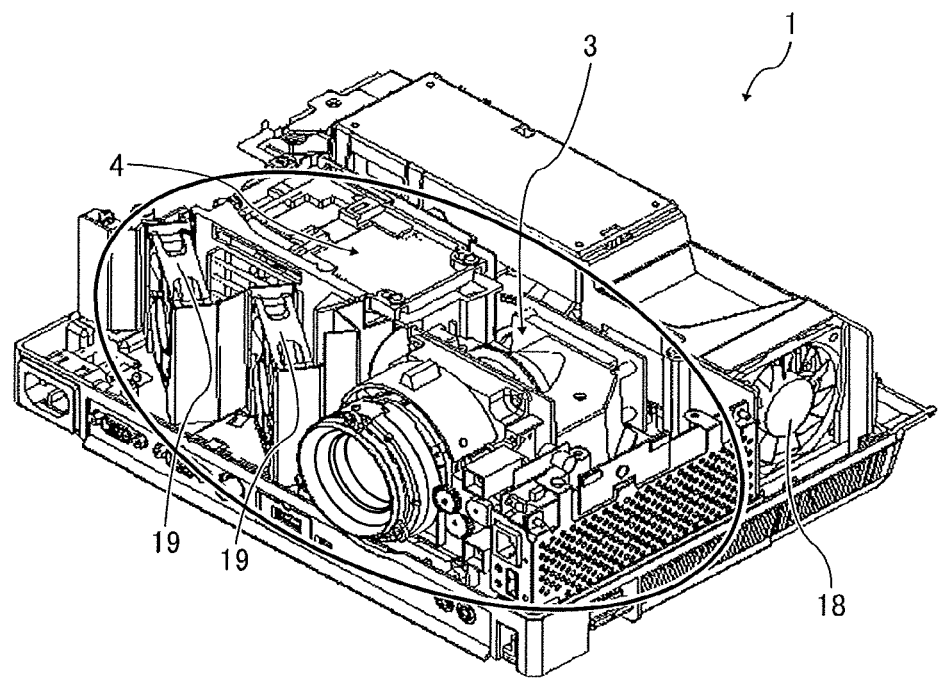
FIG. 3A is a perspective view of an internal configuration of the image projection apparatus of FIG .1 from which an outer casing is removed.
Figure 3B:
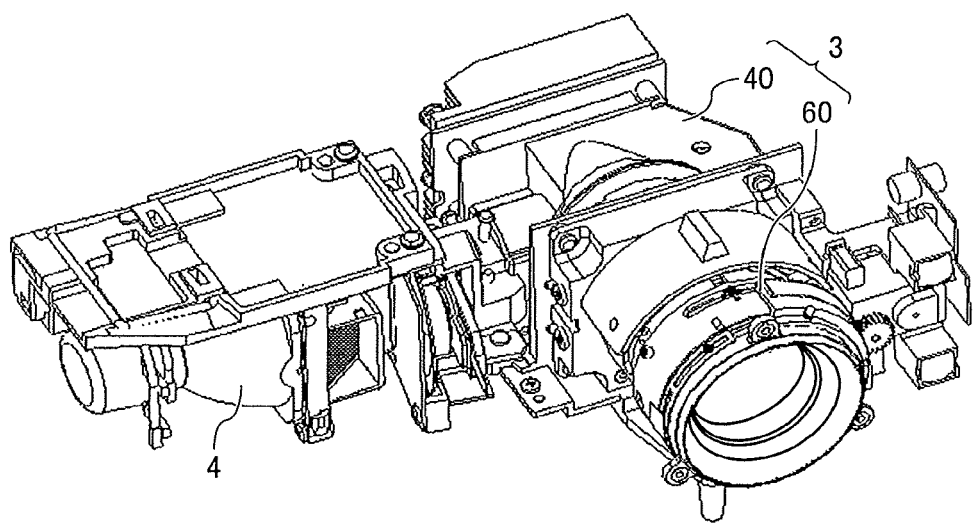
FIG. 3B is a perspective view of an encircled portion in FIG. 3A.

FIG. 3A is a perspective view of an internal configuration of the image projection apparatus 1 from which an outer casing 2 is removed. FIG. 3B is a perspective view of an encircled portion in FIG. 3A, in which an optical engine 3 and a light source unit 4 are included.

The image projection apparatus 1 has a lamp as a light source, and many electronic circuit boards inside the image projection apparatus 1. Therefore, the internal temperature of the image projection apparatus 1 rises after the image projection apparatus 1 is activated and being operated along the time line. Lately, the rise of internal temperature becomes prominent as the size of the casing of the image projection apparatus 1 has been reduced. Therefore, as illustrated in FIG. 1, the image projection apparatus 1 includes, for example, an intake port 16 and an exhaust port 17 to introduce air inside the image projection apparatus 1, and then to exhaust heated air outside the image projection apparatus 1 so that the temperature of the internal components does not exceed heatproof temperature of the internal components.

Figure 4:
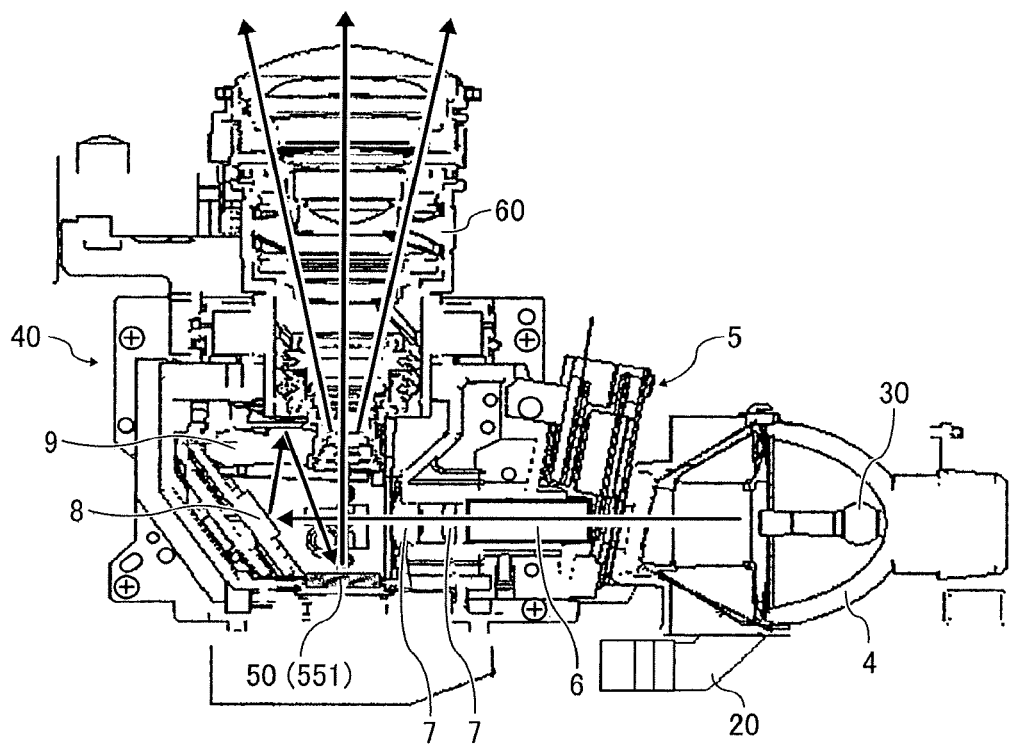
FIG. 4 is a cross-sectional view of a light guide unit, an optical projection unit, an image generation unit, and a light source unit of the image projection apparatus of FIG. 1.

Further, as illustrated in FIG. 3A and FIG. 3B, the image projection apparatus 1 includes, for example, the optical engine 3 and the light source unit 4. FIG. 4 is a cross-sectional view of a light guide unit 40 to guide light emitted from the light source unit 4, an optical projection unit 60, an image generation unit 50, and the light source unit 4 when viewed from a top side of the image projection apparatus 1. The optical engine 3 includes, for example, the light guide unit 40 and the optical projection unit 60 as illustrated in FIG. 3A and FIG. 3B.

As illustrated in FIG. 3A, an intake fan 18 is disposed inside the image projection apparatus 1 near the intake port 16, and an exhaust fan 19 is disposed inside the image projection apparatus 1 near the exhaust port 17. When air is introduced from the intake fan 18 inside the image projection apparatus 1, and then heated air is exhausted from the exhaust fan 19, the internal space and components of the image projection apparatus 1 can be cooled by a forced air flow.

In the image projection apparatus 1, light (e.g., white light) coming from a light source in the light source unit 4 enters the light guide unit 40 of the optical engine 3. Inside the light guide unit 40, the white light is separated into RGB light components, and then guided to the image generation unit 50 via a lens and a mirror. Then, an image is generated by the image generation unit 50 based on modulation signals, and the image is magnified and projected to the screen S by the optical projection unit 60.

As illustrated in FIG. 4, the light source unit 4 includes, for example, a light source 30. The light source 30 employs various lamps such as arc lamps including a high pressure mercury lamp, a xenon lamp or the like. For example, a high pressure mercury lamp is used as the light source 30.

As illustrated in FIG. 4, a light source cooling fan 20 is disposed at one side of the light source unit 4 to cool the light source 30. The rotation speed of the light source cooling fan 20 is controlled so that temperature of each part of the light source unit 4 is within the rated temperature range set for each part of the light source unit 4. Further, the emission direction of the light from the light source unit 4 and the emission direction of the image light from the optical projection unit 60 are set with a relationship of approximately 90 degrees as illustrated in FIG. 4. In this description, the light source cooling fan 20 is used as an example of the cooling device. As long as the cooling device can cool the light source unit 4, any cooling devices can be used.

Further, in the optical engine 3, the light guide unit 40 includes, for example, a color wheel 5, a light tunnel 6, two relay lenses 7, a flat mirror 8, and a concave mirror 9. The color wheel 5 (e.g., disk-shaped rotatable color filter) separates light emitted from the light source 30. The light tunnel 6 guides the light exiting from the color wheel 5. Further, the light guide unit 40 includes, for example, the image generation unit 50.

In the light guide unit 40, as indicated by arrows of FIG. 4, the white light, which is the light emitted from the light source 30, is separated into R (red), G (green), and B (blue) light components time divisionally when the light emitted from the light source 30 passes through the color wheel 5 rotating in one direction. The R (red), G (green), and B (blue) light components exiting from the color wheel 5 enter the light tunnel 6. The light tunnel 6 is a tube-shaped member having a square-like cross shape, and its internal face is finished as a mirror face. Each of the light components that enters the light tunnel 6 reflects for a plurality of times on the internal face of the light tunnel 6, and is then emitted as synthesized uniform light to the two relay lenses 7. Therefore, the light tunnel 6 is used as an optical member to convert the light into uniformed light.

Then, the light exiting from the light tunnel 6 enters the two relay lenses 7, in which the light is condensed while correcting the chromatic aberration along the light axis by the two relay lenses 7, which is a combination of two lenses. The light exiting from the two relay lenses 7 is reflected by the flat mirror 8 and the concave mirror 9, and then enters the image generation unit 50. The image generation unit 50 includes, for example, a digital micromirror device (DMD) 551 used as an image generation element or modulation element. The DMD 551 includes, for example, a plurality of micromirrors, and the plurality of micromirrors configure a substantially rectangular mirror surface. When each of micromirrors is driven by a time division control based on image data, the light is processed and reflected by the DMD 551 to generate an image light.

The image generation unit 50 selects the light that is output to the optical projection unit 60 by switching on and off of the micromirrors based on the input signals, and generates the gradation by controlling the micromirrors. Specifically, the light used for a projection image is reflected to a projection lens by the plurality of micromirrors, and the light to be discarded is reflected to an OFF plate by the DMD 551 based on image data in a time division manner. The image light generated by the image generation unit 50 is reflected to the optical projection unit 60, passes through the plurality of projection lenses disposed in the optical projection unit 60, and then projected onto the screen S as an enlarged image.

Further, the incident side of the two relay lenses 7, the flat mirror 8, the concave mirror 9, the image generation unit 50, and the optical projection unit 60 inside the light guide unit 40 is covered by a housing, and the mating surface of the housings is sealed with a sealant to configure a dust-proof structure.

Figure 5A:
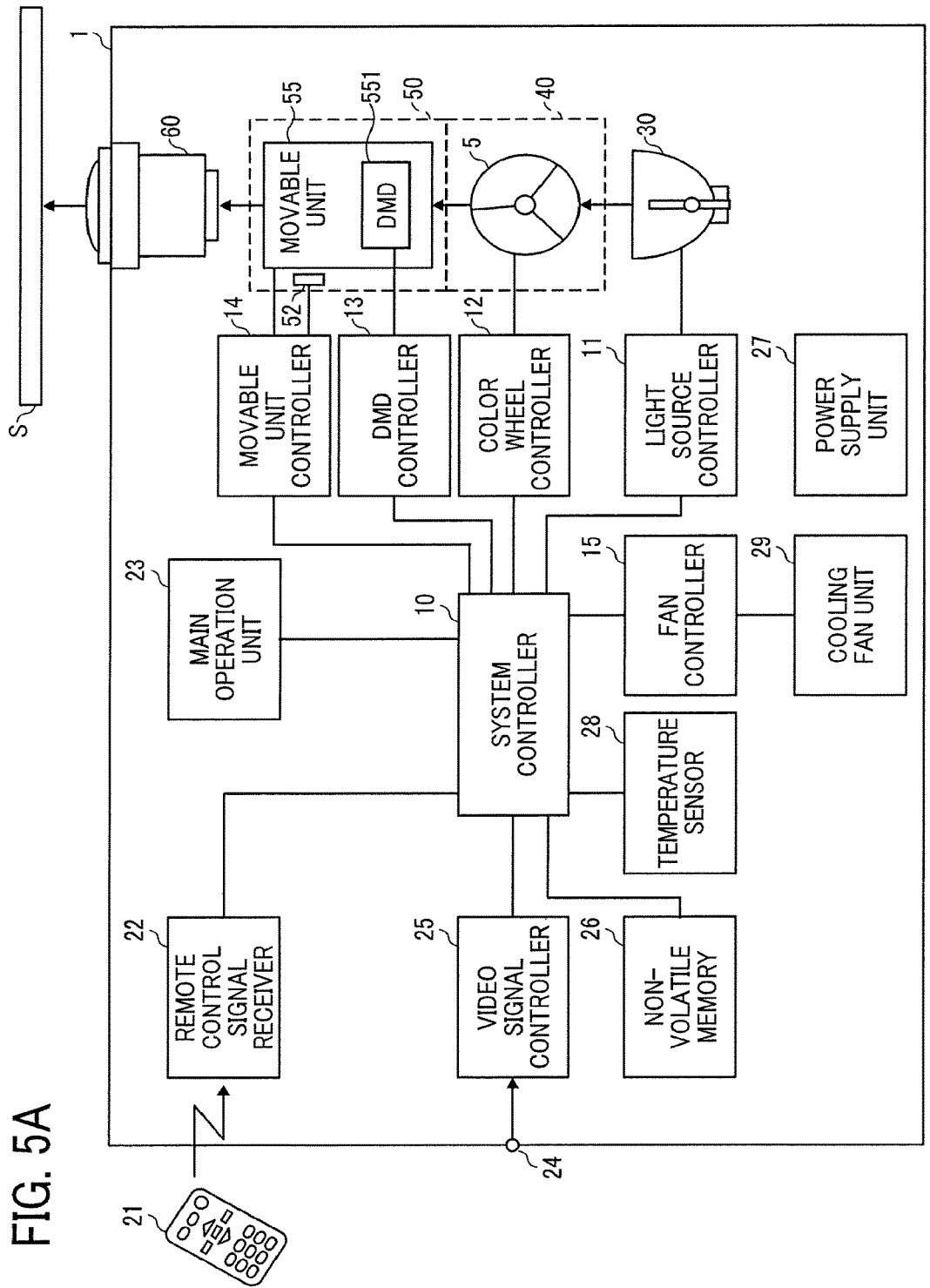
FIG. 5A is a functional block diagram illustrating an example of the image projection apparatus according to the embodiment.

FIG. 5A is a functional block diagram illustrating an example of the image projection apparatus 1 according to the first embodiment. The image projection apparatus 1 of the first embodiment includes the light source 30 as a light source to emit light, the DMD 551 as an image generation element to generate an image using the light emitted from the light source, the movable unit 55 as a shift unit to shift a position of the image generation element with a given cycle, the system controller 10 as a projection control unit to control a projection of image by using a first mode that projects an image without shifting a position of the image generation element by the shift unit, and a second mode that projects an image by shifting a position of the image generation element by the shift unit, and the position detector 52 as a detector to detect whether the image generation element operates normally. When the detector detects that the image generation element does not operate normally under the second mode, the projection control unit stops image processing under the second mode, and switches the second mode to the first mode. In this description, the movable unit 55 is used as the shift unit used for shifting the position of the DMD 551 used as the image generation element.

As illustrated in FIG. 5A, the image projection apparatus 1 includes, for example, a system controller 10, a light source controller 11, a color wheel controller 12, a DMD controller 13, a movable unit controller 14, a fan controller 15, a remote control signal receiver 22, a main operation unit 23, an input terminal 24, a video signal controller 25, a non-volatile memory 26, a power supply unit 27, a temperature sensor 28, a cooling fan unit 29, the light source 30, the light guide unit 40, the image generation unit 50, and the optical projection unit 60 to project an image onto the screen S. The image projection apparatus 1 further includes, for example, a remote controller 21 as a remote control means.

The system controller 10 performs overall control of the image projection apparatus 1. Further, the system controller 10 controls various image processing such as contrast adjustment, brightness adjustment, sharpness adjustment, scaling processing, conversion of frame rate of frames per second (fps) (refresh rate (Hz)), frame generation in an pixel shift control operation, display processing such as on-screen display (OSD) of menu information, and various other processing.

Further, the system controller 10 is connected with the light source controller 11, the color wheel controller 12, the DMD controller 13, the movable unit controller 14, the fan controller 15, the remote control signal receiver 22, the main operation unit 23, the video signal controller 25, the non-volatile memory 26, and the temperature sensor 28, and controls each of these functional units.

Figure 5B:
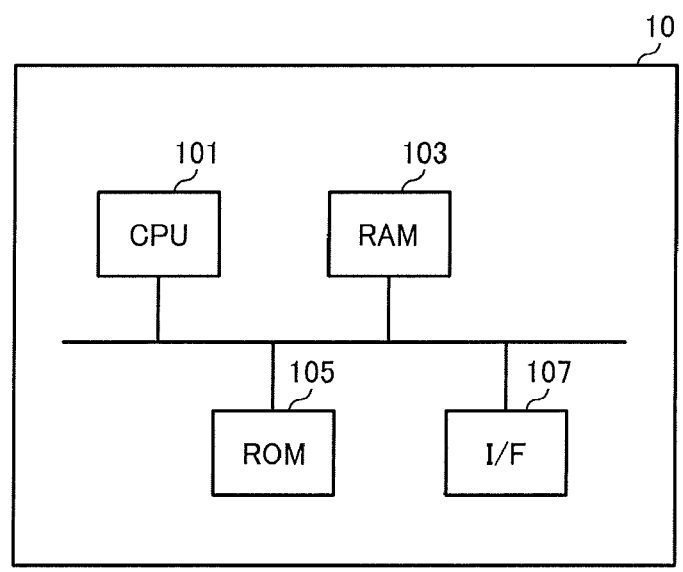
FIG. 5B is an example of a hardware block diagram of a system controller of the image projection apparatus of FIG. 1.

FIG. 5B is an example of a hardware block diagram of the system controller 10 of the image projection apparatus 1 according to the embodiment. As illustrated in FIG. 5B, the system controller 10 includes, for example, a central processing unit (CPU) 101, a read-only memory (ROM) 105, a random access memory (RAM) 103, and an interface (I/f) 107, and the functions of the units of the system controller 10 are implemented when the CPU 101 executes programs stored in the ROM 105 in cooperation with the RAM 103, but not limited thereto. For example, at least part of the functions of the units of the system controller 10 can be implemented by a dedicated hardware circuit such as a semiconductor integrated circuit. The program executed by the system controller 10 according to the embodiment may be configured to be provided by being recorded in a computer-readable recording medium such as a compact disk read only memory (CD-ROM), a flexible disk (FD), a compact disk recordable (CD-R), a digital versatile disk (DVD), and a universal serial bus (USB) memory as a file of an installable format or an executable format. Alternatively, the program may be configured to be provided or distributed through a network such as the Internet. Moreover, various programs may be configured to be provided by being pre-installed into a non-volatile recording medium such as ROM 105. Further, the hardware block configuration of FIG. 5B can be applied to other controllers.

The input terminal 24 is an interface for inputting a video signal, and includes, for example, Video Graphics Array (VGA) input terminal such as a D-Sub connector, and a video terminal such as High-Definition Multimedia Interface (HDMI) (registered trademark) terminal, S-VIDEO terminal, and RCA terminal. The image projection apparatus 1 receives a video signal from a video supply apparatus such as a computer or an audio visual (AV) device via a cable connected to the input terminal 24. Further, in some cases, the image projection apparatus 1 includes a plurality of input terminals 24.

The video signal controller 25 processes a video signal input to the input terminal 24, and performs various processes such as serial-parallel conversion and voltage level conversion on the video signal. Further, the video signal controller 25 has a signal determination function for analyzing the resolution and frequency of video signals.

The non-volatile memory 26 stores data to be used for the image processing of video signal and various other processing. For example, the non-volatile memory 26 can be a non-volatile semiconductor memory such as an erasable programmable read-only memory (EPROM), an electrically erasable programmable read-only memory (EEPROM), and a flash memory. The image projection apparatus 1 can save or store previously set contents (e.g., language setting) in the non-volatile memory 26 even after the power is turned off.

The main operation unit 23 is an interface for operating the image projection apparatus 1, and receives various operation requests from a user. Upon receiving an operation request, the main operation unit 23 reports the operation request to the system controller 10. The main operation unit 23 is configured, for example, by operation keys (e.g., operation buttons) provided on an outer surface of the image projection apparatus 1.

The remote control signal receiver 22 receives an operation signal from the remote controller 21. Upon receiving the operation signal from the remote controller 21, the remote control signal receiver 22 reports the operation signal to the system controller 10.

A user can set various settings by operating the main operation unit 23 or the remote controller 21. For example, the user can instruct to display a menu screen, select an installation state of the image projection apparatus 1, a change request of the aspect ratio of the image projection apparatus 1, a power supply ON/OFF request of the image projection apparatus 1, a lamp power change request to change light intensity of the light source 30, an image mode change to change image quality (e.g., high brightness, standard, natural) of a projected image, a freeze request to stop the projected image, an operation mode change request for a pixel-shift control operation, an ON/OFF setting of the pixel-shift control operation, and the like.

The fan controller 15 acquires the internal temperature of the image projection apparatus 1 detected by the temperature sensor 28, and controls the cooling fan unit 29 so that the internal temperature in the image projection apparatus 1 and the temperature of the light source 30 are within a specific temperature range such as heatproof temperature range.

The power supply unit 27 is connected to each device in the image projection apparatus 1, and converts an alternating current (AC) power, input from an electrical outlet, into a direct current (DC), and supplies the DC to each device in the image projection apparatus 1.

The temperature sensor 28 is provided at a given position in the image projection apparatus 1. The temperature sensor 28 used as a temperature detector for detecting the internal temperature of the image projection apparatus 1, and a detection result (i.e., internal temperature of the image projection apparatus 1) detected by the temperature sensor 28 is transmitted to the system controller 10.

The cooling fan unit 29 can be configured by the intake fan 18, the exhaust fan 19, and the light source cooling fan 20. When air is introduced from the intake fan 18 inside the image projection apparatus 1, and then heated air is exhausted from the exhaust fan 19, the internal space and components of the image projection apparatus 1 can be cooled by a forced air flow. Further, the light source cooling fan 20 is disposed at one side of the light source unit 4 to cool the light source 30. The rotation speed of the light source cooling fan 20 is controlled based on the internal temperature of the image projection apparatus 1. Further, the light source cooling fan 20 and the cooling fan unit 29 can be integrated as one cooling fan unit.

The light source 30 is, for example, a high pressure mercury lamp, which emits light by a discharge between a pair of electrodes, and the light source 30 irradiates light to the light guide unit 40. Further, the light source 30 can use a xenon lamp, and a light emitting diode (LED). Further, the light source controller 11 controls ON/OFF of the light source 30 and the light power.

The light emitted from the light source 30 is separated into R (red), G (green), and B (blue) light components time divisionally when the light emitted from the light source 30 passes through the color wheel 5 rotating in one direction in the light guide unit 40, in which each color light exits from the disc-shaped color wheel 5 at each unit time.

The color wheel controller 12 controls the rotation movement of the color wheel 5.

The light exiting from the color wheel 5 is condensed on the DMD 551 used as the image generation element in the image generation unit 50 via the light tunnel 6, the two relay lenses 7, the flat mirror 8, and the concave mirror 9.

The image generation unit 50 includes, for example, a fixed unit 51 (FIG. 6) fixed to a frame, and a movable unit 55 movably supported by the fixed unit 51 so that the movable unit 55 can be moved with respect to the fixed unit 51. The movable unit 55 includes, for example, the DMD 551. The position of the movable unit 55 with respect to the fixed unit 51 is controlled by the movable unit controller 14.

The movable unit 55 includes, for example, an electromagnetic actuator (e.g., voice coil, magnet) as a drive unit. The movable unit controller 14 controls the amount of current to flow to the drive unit of the movable unit 55 to control the shift amount of the DMD 551. The shift control of the DMD 551 by the movable unit controller 14 can be turned on/off by operating the main operation unit 23 or the remote controller 21. When the shift control of the DMD 551 is set to OFF, a normal projection image not performing the shifting of DMD 551 is displayed.

Further, the position of the movable unit 55 (i.e., DMD 551) can be detected by the position detector 52 (position sensor) such as a light sensor or a magnetic sensor provided for the image generation unit 50. The movable unit controller 14 determines whether the movable unit 55 is at a target position based on the amount of current (i.e., control parameter) flowed to the drive unit of the movable unit 55 and the detection result (i.e., control result) of the position detector 52, in which the movable unit controller 14 detects whether the moving unit 55 operates normally, and a detection result is input to the system controller 100. The reason why the movable unit 55 is not operated normally includes, for example, influences such as component distortion and adhesion of dust in the image generation unit 50, and the influence of disconnection of the flexible printed circuits (FPC) between the image generation unit 50 and the control unit. Further, the position detector 52 is not particularly limited to a specific sensor as long as the position detector 52 can detect whether the DMD 551 is operated desirably (desired shift amount). In this configuration, the movable unit 55 is referred to as the shift unit that shifts the position of the DMD 551 used as the image generation element.

The DMD 551 has a substantially rectangular mirror surface configured by the plurality of micromirrors. When each of micromirrors is driven by a time division control based on image data, the light coming from the light guide unit 40 is processed and reflected by the DMD 551 to generate an image light. The DMD controller 13 controls on/off of the micromirrors of the DMD 551.

The light used for a projection image is reflected to the optical projection unit 60 by the plurality of micromirrors of the DMD 551, and the light to be discarded is reflected to the OFF plate by the DMD 551 based on image data in a time division manner. The image light generated by the image generation unit 50 is reflected to the optical projection unit 60, passes through the optical projection unit 60, and then projected onto the screen S as an enlarged image.

The optical projection unit 60 includes, for example, a plurality of projection lenses and mirrors. The optical projection unit 60 magnifies or enlarges the image generated by the DMD 551 of the image generation unit 50, and project the magnified or enlarged image on the screen S.

(Image Generation Unit)

Figure 7:
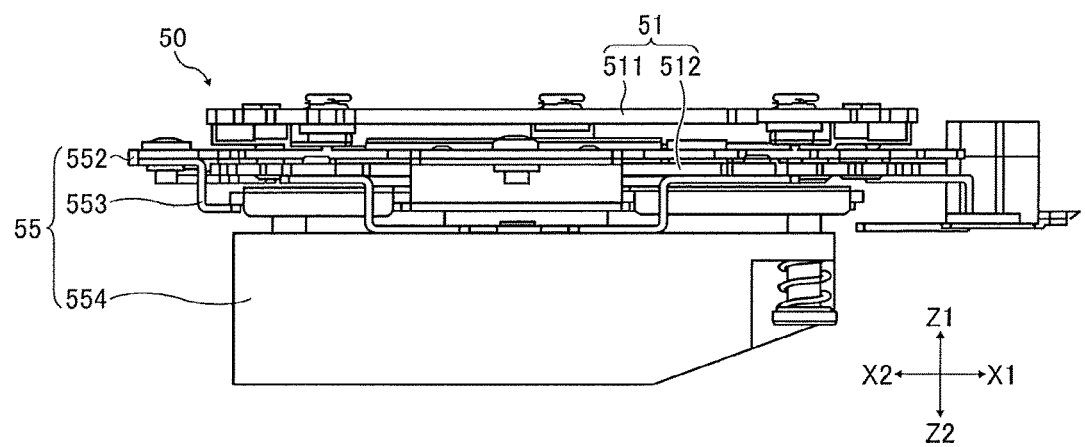
FIG. 7 is a side view of the image generation unit of FIG. 6.

FIG. 6 is a perspective view of the image generation unit 50 according to the embodiment. FIG. 7 is a side view of the image generation unit 50 according to the embodiment.

As illustrated in FIG. 6 and FIG. 7, the image generation unit 50 includes the fixed unit 51, and the movable unit 55. The fixed unit 51 is fixed to a frame of the image projection apparatus 1 while the movable unit 55 is moveably supported by the fixed unit 51. The fixed unit 51 may be also referred to as a non-movable unit.

The fixed unit 51 includes a top plate 511 as a first fixed plate, and a base plate 512 as a second fixed plate. In the fixed unit 51, the top plate 511 and the base plate 512 are provided in parallel to each other with a given space therebetween.

The movable unit 55 includes the DMD 551, a movable plate 552 as a first movable plate, a coupling plate 553 as a second movable plate, and a heat sink 554, and the movable unit 55 is movably supported by the fixed unit 51.

The movable plate 552 is provided between the top plate 511 and the base plate 512 of the fixed unit 51, and is supported by the fixed unit 51 in parallel to the top plate 511 and the base plate 512 and is movably supported by the fixed unit 51 in a direction parallel to the surfaces of the top plate 511 and the base plate 512.

The coupling plate 553 is fixed to the movable plate 552 by interposing the base plate 512 of the fixed unit 51 between the coupling plate 553 and the movable plate 552. As to the coupling plate 553, the DMD 551 is fixed to the upper side of the coupling plate 553, and the heat sink 554 is fixed to the lower side of the coupling plate 553. The coupling plate 553 is fixed to the movable plate 552, and is thereby movably supported by the fixed unit 51 together with the movable plate 552, the DMD 551, and the heat sink 554.

The DMD 551 is provided on a plane of the coupling plate 553 closer to the movable plate 552, and is provided movably together with the movable plate 552 and the coupling plate 553. The DMD 551 includes an image generation plane where a plurality of movable micromirrors are arranged in a lattice pattern. As to each of the micromirrors of the DMD 551, the mirror surface of each of the micromirrors of the DMD 551 is mounted tiltably about a torsion axis, and each of the micromirrors of the DMD 551 is ON/OFF driven based on an image signal transmitted from the DMD controller 13.

For example, in the case of "ON", an inclination angle of the micromirror is controlled so as to reflect the light emitted from the light source 30 to the optical projection unit 60. Further, for example, in the case of "OFF", an inclination angle of the micromirror is controlled in a direction for reflecting the light emitted from the light source 30 toward the OFF plate.

With this configuration, the inclination angle of each of the micromirrors of the DMD 551 is controlled based on the image signal transmitted from the DMD controller 13, and the DMD 551 modulates the light emitted from the light source 30 and passing through the light guide unit 40 to generate a projection image.

The heat sink 554 is an example of a heat radiating unit, and is provided such that at least part of the heat sink 554 is in contact with the DMD 551. The heat sink 554 is provided for the movably supported coupling plate 553 together with the DMD 551 such that the heat sink 554 is in contact with the DMD 551, with which the DMD 551 can be efficiently cooled. Based on this configuration, in the image projection apparatus 1 according to the embodiment, the heat sink 554 suppresses an increase of the temperature of the DMD 551 so that occurrence of troubles such as a malfunction or a failure due to the increase of the temperature of the DMD 551 can be reduced.

(Fixed Unit)

Figure 8:
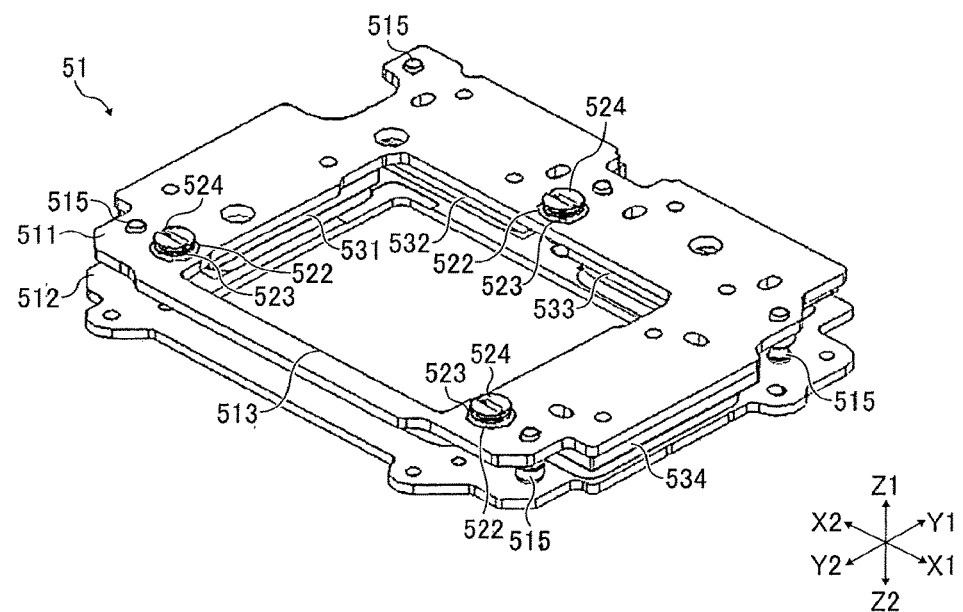
FIG. 8 is a perspective view of a fixed unit according to the embodiment.
Figure 9:
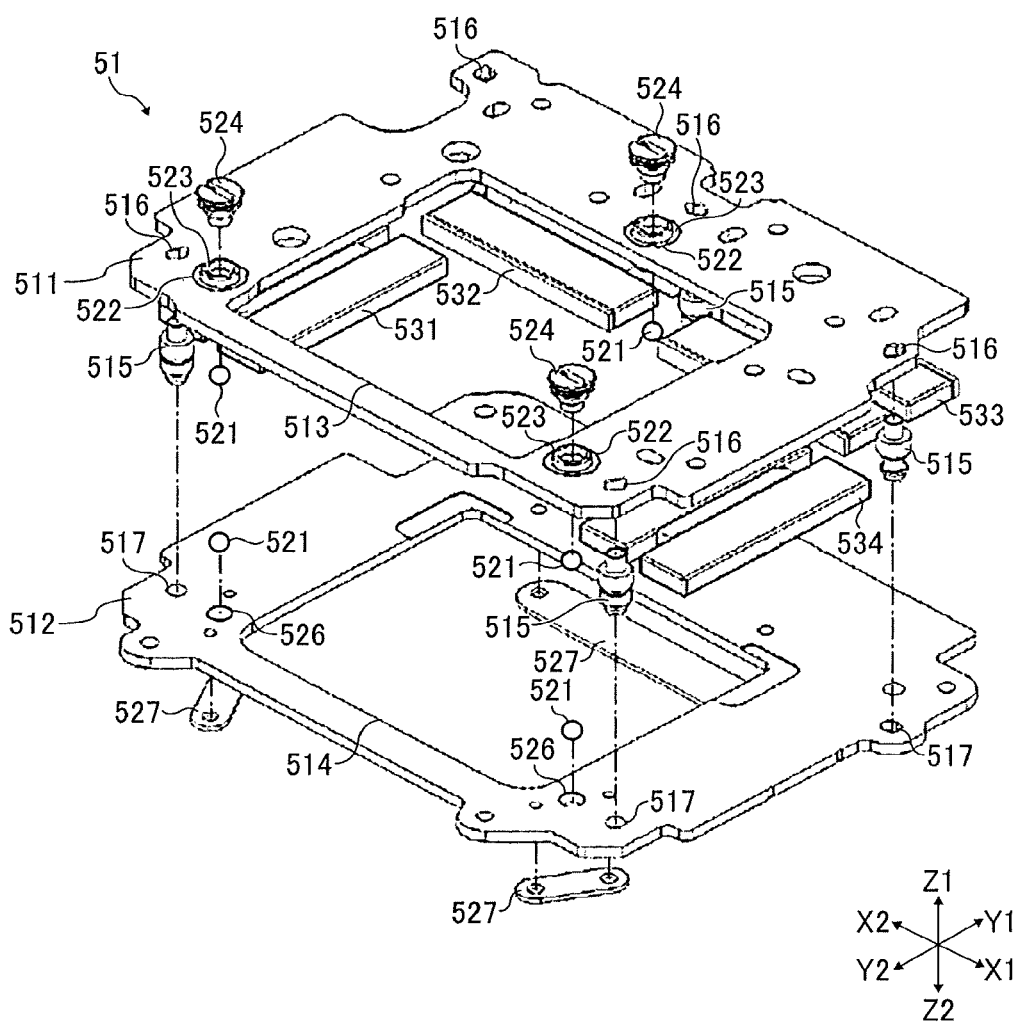
FIG. 9 is an exploded perspective view of the fixed unit of FIG. 8.

FIG. 8 is a perspective view of the fixed unit 51 according to the embodiment. FIG. 9 is an exploded perspective view of the fixed unit 51 according to the embodiment.

As illustrated in FIG. 8 and FIG. 9, the fixed unit 51 includes the top plate 511 and the base plate 512.

The top plate 511 and the base plate 512 are each formed from a plate member, and have central holes 513 and 514 respectively provided at positions corresponding to the DMD 551 of the movable unit 55. The top plate 511 and the base plate 512 are provided in parallel to each other by a plurality of supports 515 with a given space therebetween.

As illustrated in FIG. 9, an upper end of the support 515 is pressed into a supporting hole 516 formed in the top plate 511, and a lower end of the support 515 where a male screw groove is formed is inserted into a supporting hole 517 formed in the base plate 512. A plurality of the supports 515 forms a given space between the top plate 511 and the base plate 512 and supports the top plate 511 and the base plate 512 in a parallel manner.

Further, a plurality of supporting holes 522 and 526, each of which rotatably holds a supporting sphere 521, are formed in the top plate 511 and the base plate 512, respectively.

A cylindrical holding member 523 having a female screw groove in its inner periphery is inserted into the supporting hole 522 of the top plate 511. The holding member 523 rotatably holds the supporting sphere 521, and a position adjustment screw 524 is inserted into the holding member 523 from above. The supporting hole 526 of the base plate 512 is covered at its lower end by a lid member 527, and rotatably holds the supporting sphere 521.

The supporting spheres 521 rotatably held by the respective supporting holes 522 and 526 of the top plate 511 and the base plate 512 are in contact with the movable plate 552 provided between the top plate 511 and the base plate 512 to movably support the movable plate 552.

Figure 10:
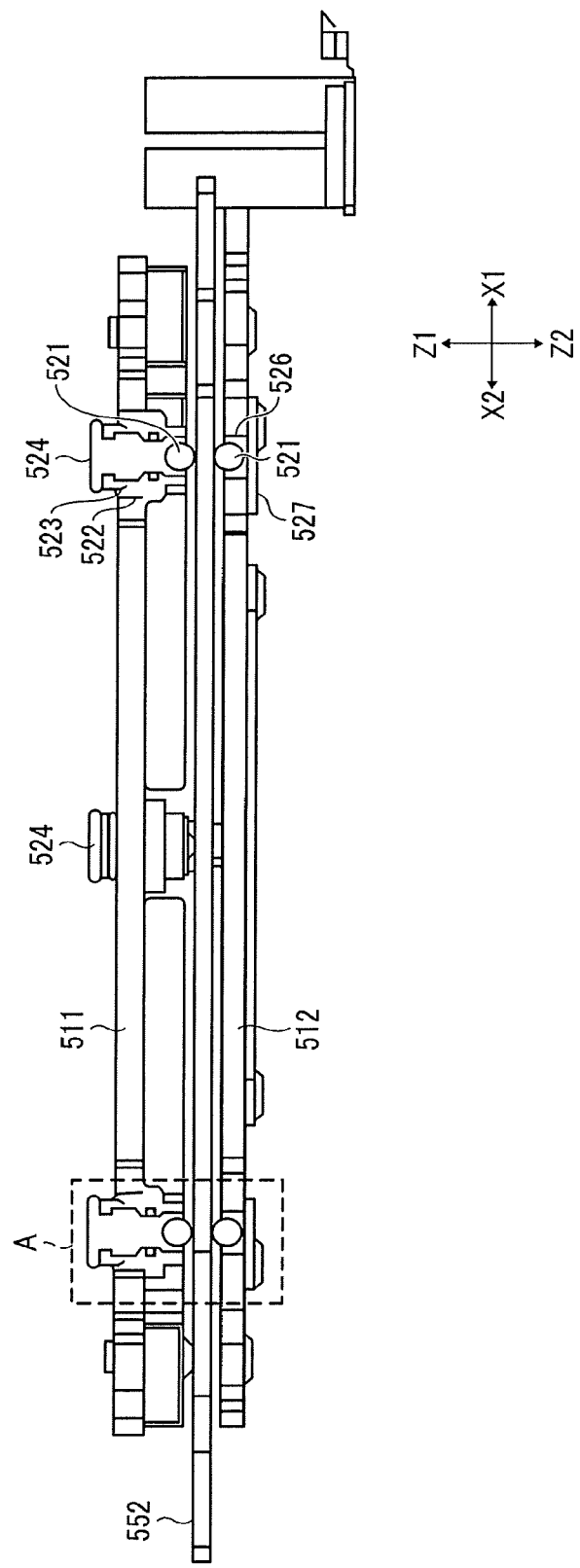
FIG. 10 illustrates a support structure of a movable plate using the fixed unit of FIG. 8.
Figure 11:
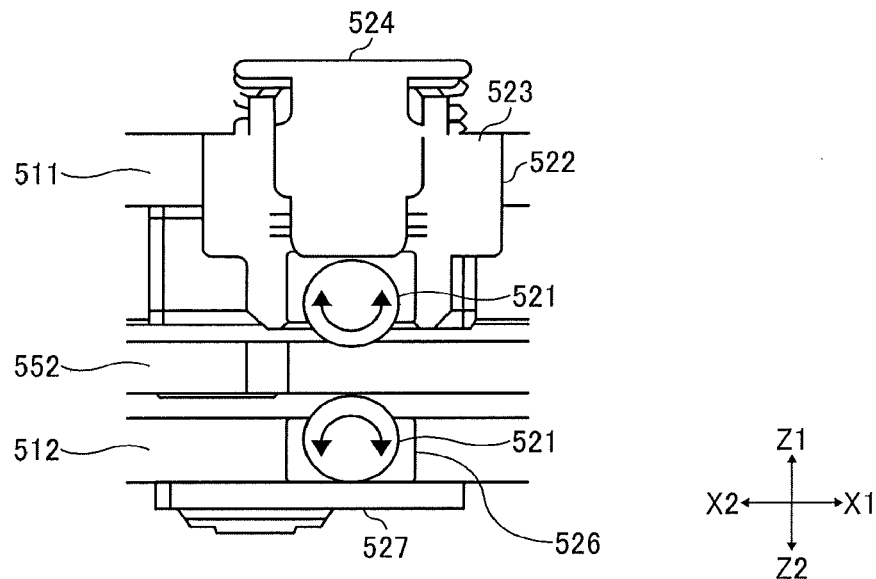
FIG. 11 is a partially enlarged view of the support structure at a portion A in FIG. 10.

FIG. 10 illustrates a support structure of the movable plate 552 using the fixed unit 51. FIG. 11 is a partially enlarged view of the support structure at a portion A in FIG. 10.

As illustrated in FIG. 10 and FIG. 11, in the top plate 511, the supporting sphere 521 is rotatably held by the holding member 523 inserted into the supporting hole 522. In the base plate 512, the supporting sphere 521 is rotatably held by the supporting hole 526 whose lower end is covered by the lid member 527.

The supporting spheres 521 are held such that at least part thereof protrudes from the supporting holes 522 and 526, and are in contact with and supporting the movable plate 552 provided between the top plate 511 and the base plate 512. The movable plate 552 is supported by the rotatably provided supporting spheres 521 from both sides of the movable plate 552 so as to be supported in parallel to the top plate 511 and the base plate 512 and movably in a direction parallel to the surfaces of the top plate 511 and the base plate 512.

Further, as to the supporting sphere 521 provided on the top plate 511, an amount of protrusion of the supporting sphere 521 from the lower end of the holding member 523 is changed by adjusting the position of the position adjustment screw 524 that contacts with the supporting sphere 521 at one side of the supporting sphere 521 that is farther from the movable plate 552. For example, when the position adjustment screw 524 is displaced in the Z1 direction, the amount of protrusion of the supporting sphere 521 decreases, with which a space between the top plate 511 and the movable plate 552 is reduced. Further, for example, when the position adjustment screw 524 is displaced in the Z2 direction, the amount of protrusion of the supporting sphere 521 increases, with which a space between the top plate 511 and the movable plate 552 is increased.

With this configuration, by changing the amount of protrusion of the supporting sphere 521 using the position adjustment screw 524, the space between the top plate 511 and the movable plate 552 can be appropriately adjusted.

Further, as illustrated in FIG. 8 and FIG. 9, magnets 531, 532, 533, and 534 are provided on the plane of the top plate 511 closer to the base plate 512.

Figure 12:
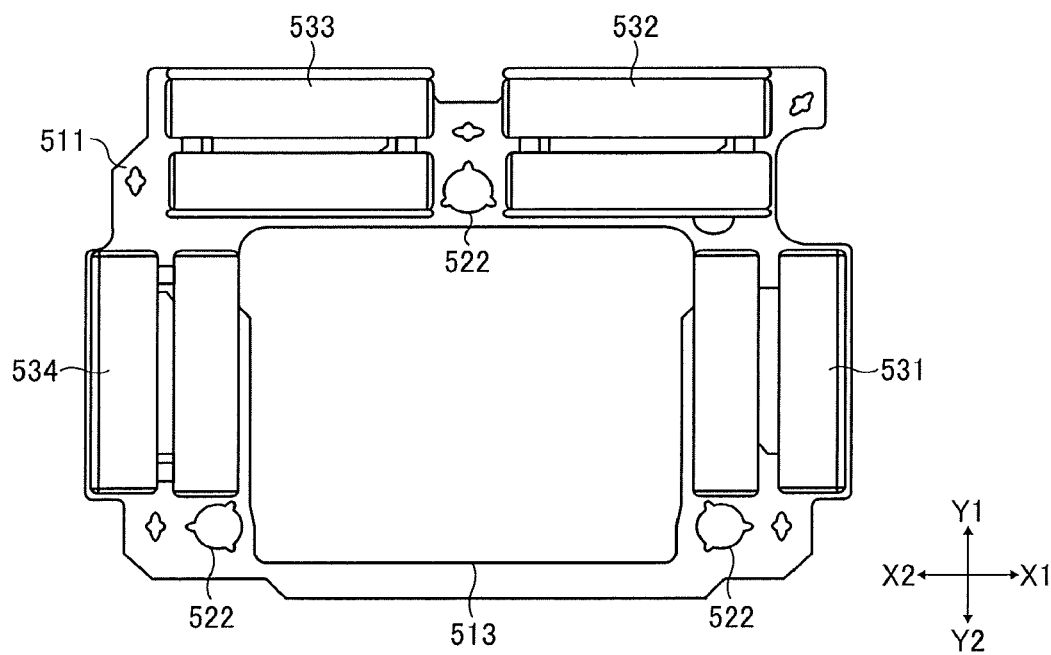
FIG. 12 is a bottom view of a top plate according to the embodiment.

FIG. 12 is a bottom view of the top plate 511 according to the embodiment. As illustrated in FIG. 12, the magnets 531, 532, 533, and 534 are provided on the plane of the top plate 511 closer to the base plate 512.

The magnets 531, 532, 533, and 534 are arranged at four locations so as to surround the central hole 513 of the top plate 511. Each of the magnets 531, 532, 533, and 534 is configured with two cuboid magnets arranged such that their longitudinal directions are parallel to each other, and the two cuboid magnets form a magnetic field effecting the movable plate 552.

The magnets 531, 532, 533, and 534 configure a movement unit for moving the movable plate 552 in cooperation with coils that are provided on the upper surface of the movable plate 552 while each of the coils facing the magnets 531, 532, 533, and 534.

Further, the number, the locations, and the like of the supports 515 and the supporting spheres 521 provided in the fixed unit 51 are not limited to the configuration illustrated in the embodiment as long as they are capable of movably supporting the movable plate 552.

(Movable Unit)

Figure 13:
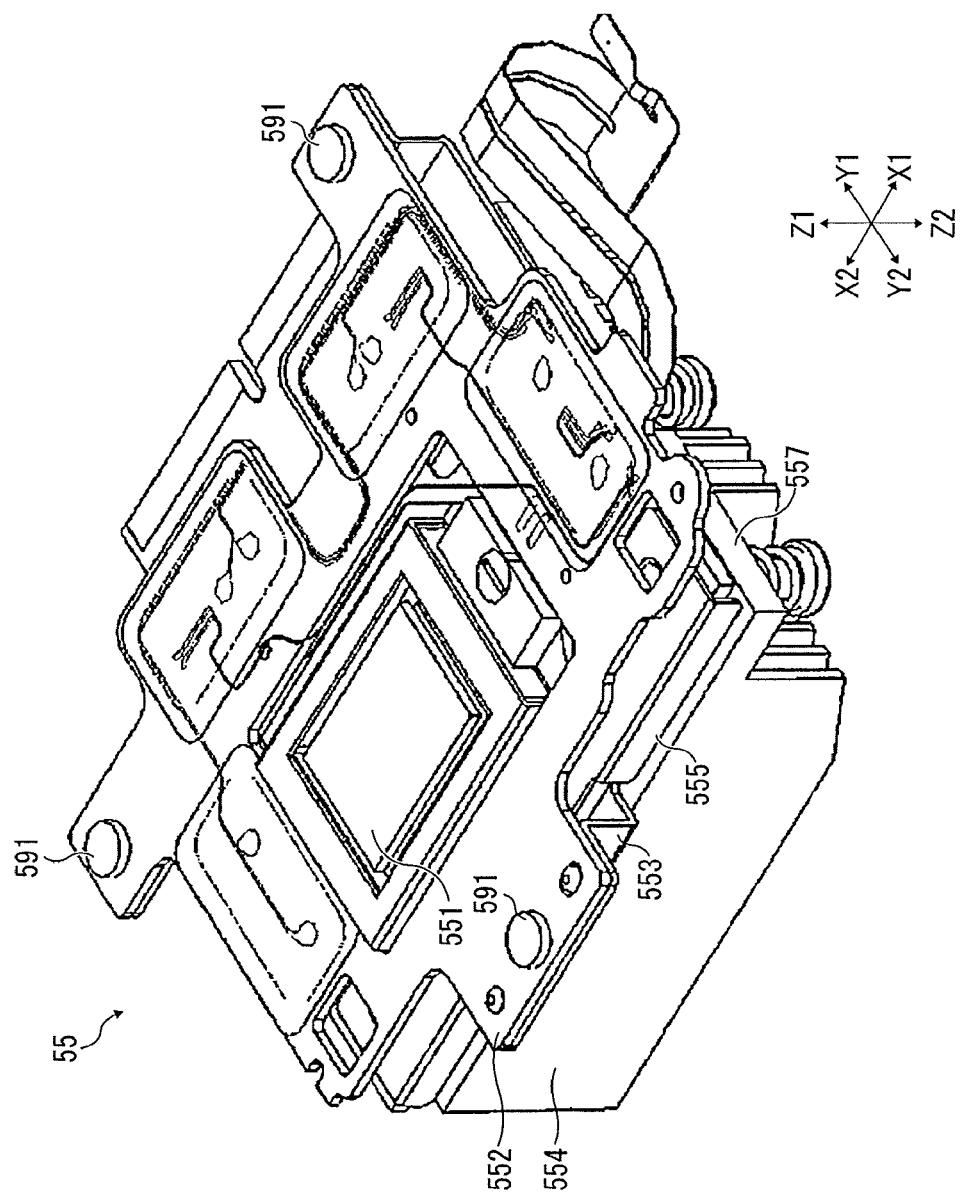
FIG. 13 is a perspective view of a movable unit according to the embodiment.
Figure 14:
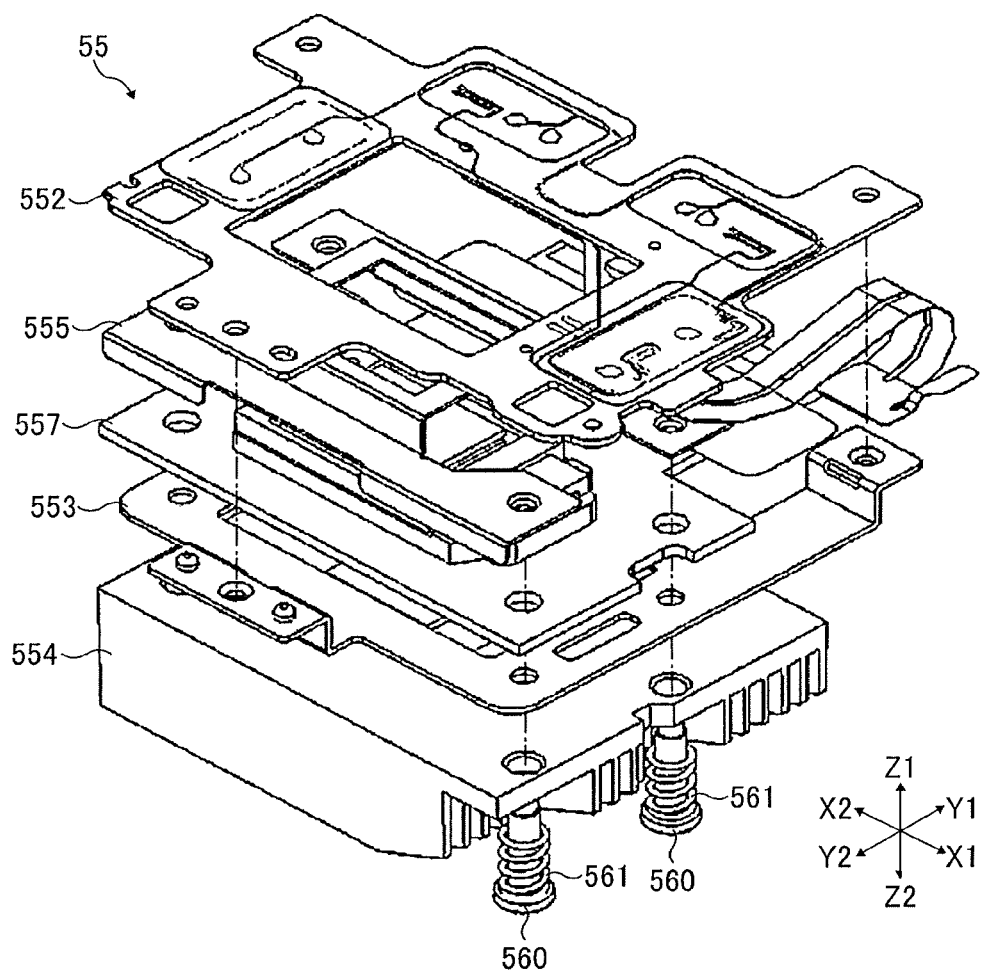
FIG. 14 is an exploded perspective view of the movable unit of FIG. 13.

FIG. 13 is a perspective view of the movable unit 55 according to the embodiment. FIG. 14 is an exploded perspective view of the movable unit 55 according to the embodiment.

As illustrated in FIG. 13 and FIG. 14, the movable unit 55 includes the DMD 551, the movable plate 552, the coupling plate 553, the heat sink 554, a holding member 555, and a DMD substrate 557, and is movably supported by the fixed unit 51.

As described above, the movable plate 552 is provided between the top plate 511 and the base plate 512 of the fixed unit 51, and is supported movably in a direction parallel to the surfaces of the top plate 511 and the base plate 512 by the supporting spheres 521.

Figure 15:
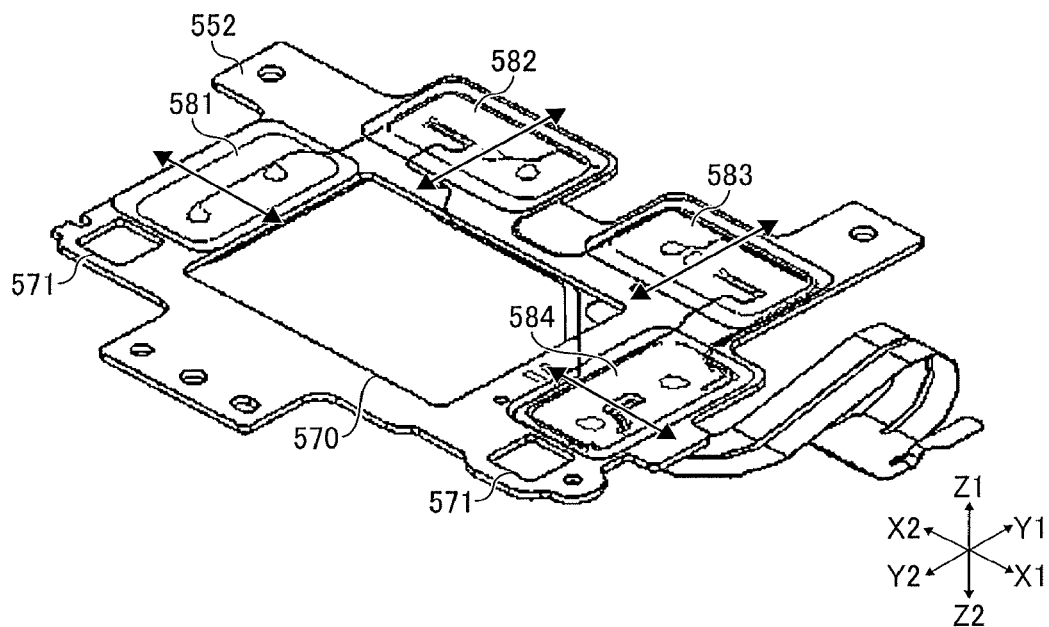
FIG. 15 is a perspective view of a movable plate according to the embodiment.

FIG. 15 is a perspective view of the movable plate 552 according to the embodiment.

As illustrated in FIG. 15, the movable plate 552 is formed from a plate member, has a central hole 570 made at a position corresponding to the DMD 551 provided in the DMD substrate 557, and also has coils 581, 582, 583, and 584 provided around the central hole 570.

Each of the coils 581, 582, 583, and 584 is formed by an electric wire being wound around an axis parallel to the Z1-Z2 direction, is provided in a recess formed on the side of the movable plate 552 closer to the top plate 511, and is covered with a cover. The coils 581, 582, 583, and 584 configure the movement unit for moving the movable plate 552 in cooperation with the respective magnets 531, 532, 533, and 534 of the top plate 511.

The magnets 531, 532, 533, and 534 of the top plate 511 and the coils 581, 582, 583, and 584 of the movable plate 552 are provided in locations so as to face each other, respectively, in the state that the movable unit 55 is supported by the fixed unit 51. When a current is made to flow in the coils 581, 582, 583, and 584, a Lorentz force used as a drive force for moving the movable plate 552 is generated by the magnetic field formed by the magnets 531, 532, 533, and 534.

When the movable plate 552 receives the Lorentz force as the drive force generated between the magnets 531, 532, 533, and 534 and the coils 581, 582, 583, and 584, the movable plate 552 is linearly or rotationally displaced on the X-Y plane with respect to the fixed unit 51.

The magnitude and direction of the current flowing in each of the coils 581, 582, 583, and 584 is controlled by the movable unit controller 14. The movable unit controller 14 controls a movement direction (linear or rotation direction), a movement amount, and a rotation angle of the movable plate 552 by controlling the magnitude and direction of the current flowing in each of the coils 581, 582, 583, and 584.

In the embodiment, the coil 581 and the magnet 531 facing each other and the coil 584 and the magnet 534 facing each other disposed at the opposite positions in the X1-X2 direction configure a first drive unit. When a current is made to flow in the coil 581 and the coil 584, the Lorentz force is generated in the X1 direction or in the X2 direction as illustrated in FIG. 15. The movable plate 552 is moved in the X1 direction or in the X2 direction by the Lorentz forces generated between the coil 581 and the magnet 531 and between the coil 584 and the magnet 534.

Further, in the embodiment, the coil 582 and the magnet 532 facing each other and the coil 583 and the magnet 533 facing each other disposed in parallel in the X1-X2 direction configure a second drive unit. Further, the magnet 532 and the magnet 533 are arranged such that the longitudinal directions of the magnet 532 and the magnet 533 are perpendicular to the longitudinal directions of the magnet 531 and the magnet 534. Based on this configuration, when a current is made to flow in the coil 582 and the coil 583, the Lorentz force is generated in the Y1 direction or in the Y2 direction as illustrated in FIG. 15.

The movable plate 552 is moved in the Y1 direction or in the Y2 direction by the Lorentz forces generated between the coil 582 and the magnet 532 and between the coil 583 and the magnet 533. Further, the movable plate 552 is displaced to rotate on the X-Y plane by a Lorentz force generated between the coil 582 and the magnet 532 and a Lorentz force generated between the coil 583 and the magnet 533, which are generated in the opposite directions.

For example, when a current is made to flow such that a Lorentz force is generated in the Y1 direction by the coil 582 and the magnet 532 and a Lorentz force is generated in the Y2 direction by the coil 583 and the magnet 533, the movable plate 552 is displaced to rotate clockwise when viewed from the top. Further, when a current is made to flow such that a Lorentz force is generated in the Y2 direction by the coil 582 and the magnet 532 and a Lorentz force is generated in the Y1 direction by the coil 583 and the magnet 533, the movable plate 552 is displaced to rotate counterclockwise when viewed from the top.

Further, a movable range restriction hole 571 is provided in the movable plate 552 at a position corresponding to the support 515 of the fixed unit 51. The support 515 of the fixed unit 51 is inserted in the movable range restriction hole 571, and the movable range restriction hole 571 restricts a movable range of the movable plate 552 by coming in contact with the support 515 when the movable plate 552 is largely moved due to, for example, vibration or some abnormality.

As described above, in the embodiment, the movable unit controller 14 controls the magnitude or the direction of the current to be made to flow in the coils 581, 582, 583, and 584, with which the movable plate 552 can be moved to any positions within the movable range.

Further, the number, the locations, and the like of the magnets 531, 532, 533, and 534 and the coils 581, 582, 583, and 584, which function as the movement unit, may be configured in a different manner from that of the embodiment as long as the movable plate 552 can be moved to any positions. For example, the magnets used as the movement unit may be provided on the upper surface of the top plate 511 or may be provided on any plane of the base plate 512. Further, for example, a configuration in which the magnets are provided on the movable plate 552 and the coils are provided on the top plate 511 or the base plate 512, may be employed.

Further, the number, the locations, the shape, and the like of the movable range restriction hole 571 are not limited to the configuration illustrated in the embodiment. For example, the number of movable range restriction holes 571 may be one or plural. Further, the shape of the movable range restriction hole 571 may be different from that of the embodiment, and may be a rectangle or a circle.

As illustrated in FIG. 13, the coupling plate 553 is fixed to the lower side (the side closer to the base plate 512) of the movable plate 552 movably supported by the fixed unit 51. The coupling plate 553 is formed from a plate member, has a central hole made at a position corresponding to the DMD 551, and has bent portions provided at periphery of the coupling plate 553 that are fixed to the lower side of the movable plate 552 by using three screws 591.

Figure 16:
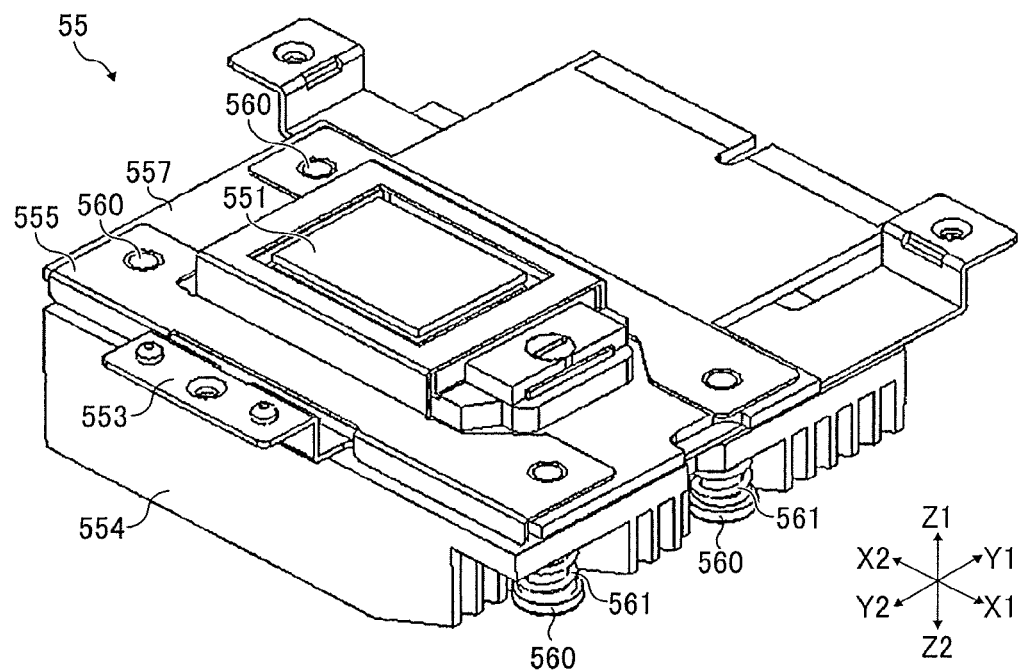
FIG. 16 is a perspective view of the movable unit of FIG. 13 from which the movable plate is removed.

FIG. 16 is a perspective view of the movable unit 55 from which the movable plate 552 is removed.

As illustrated in FIG. 16, the coupling plate 553 has the DMD 551 provided on its upper surface and the heat sink 554 provided on its lower surface. Since the coupling plate 553 is fixed to the movable plate 552, the coupling plate 553 having the DMD 551 and the heat sink 554 is provided movably with respect to the fixed unit 51 as the movable plate 552 is provided movably with respect to the fixed unit 51.

The DMD 551 is provided on the DMD substrate 557, and the DMD substrate 557 is sandwiched between the holding member 555 and the coupling plate 553, with which the DMD 551 is fixed to the coupling plate 553. As illustrated in FIG. 14 and FIG. 16, the holding member 555, the DMD substrate 557, the coupling plate 553, and the heat sink 554 are overlapped and fixed using stepped screws 560 as fixing units and springs 561 as pressing units.

Figure 17:
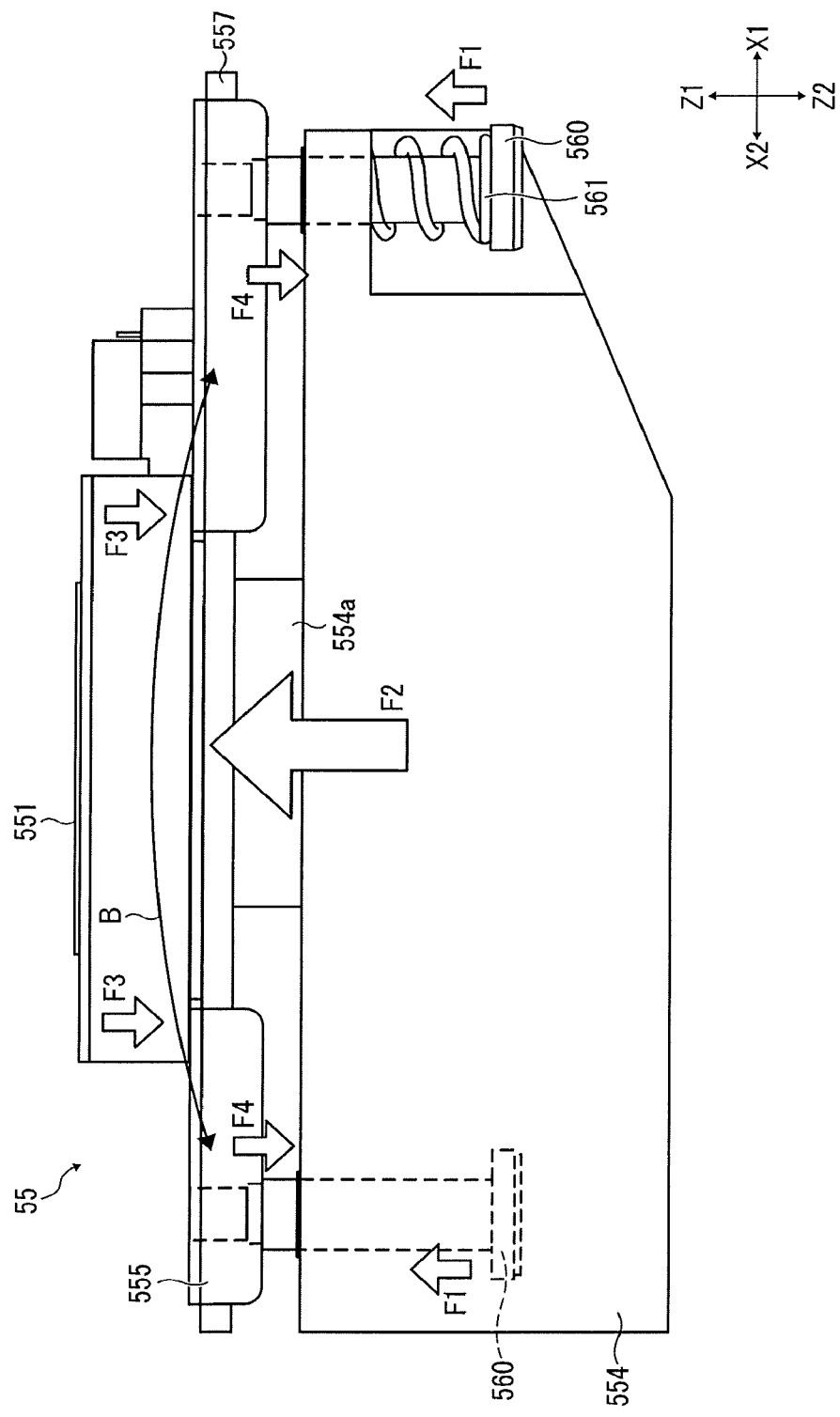
FIG. 17 illustrates a DMD holding structure of the movable unit of FIG. 13, according to the embodiment.

FIG. 17 illustrates a DMD holding structure of the movable unit 55 according to the embodiment. FIG. 17 is a side view of the movable unit 55, in which the movable plate 552 and the coupling plate 553 are omitted.

As illustrated in FIG. 17, the heat sink 554 has a projecting portion 554a in contact with the lower side of the DMD 551 through a through hole provided in the DMD substrate 557 in the state that the heat sink 554 is fixed to the coupling plate 553. Further, the projecting portion 554a of the heat sink 554 may be provided such that it is in contact with a position of the lower side of the DMD substrate 557 corresponding to the DMD 551.

Further, to enhance a cooling effect of the DMD 551, an elastically deformable heat transfer sheet may be provided between the projecting portion 554a of the heat sink 554 and the DMD 551. By providing the elastically deformable heat transfer sheet between the projecting portion 554a of the heat sink 554 and the DMD 551, a thermal conductivity between the projecting portion 554a of the heat sink 554 and the DMD 551 is enhanced, and the cooling effect of the DMD 551 by the heat sink 554 is enhanced.

As described above, the holding member 555, the DMD substrate 557, and the heat sink 554 are overlapped and fixed using the stepped screws 560 and the springs 561. When the stepped screws 560 are tightened, the springs 561 are compressed in the Z1-Z2 direction, and a force F1 in the Z1 direction illustrated in FIG. 17 is generated from the spring 561. The heat sink 554 is pressed against the DMD 551 by a force F2 in the Z1 direction due to forces F1 generated from the springs 561.

In the embodiment, the stepped screws 560 and the springs 561 are provided at four locations, and the force F2 applied to the heat sink 554 is equal to that obtained by combining the forces F1 generated in the four springs 561. Further, the force F2 from the heat sink 554 acts on the holding member 555 that holds the DMD substrate 557 where the DMD 551 is provided. Consequently, a force F3 in the Z2 direction corresponding to the force F2 from the heat sink 554 is generated in the holding member 555, so that the DMD substrate 557 can be held between the holding member 555 and the coupling plate 553.

A force F4 in the Z2 direction acts on the stepped screw 560 and the spring 561 from the force F3 generated in the holding member 555. Since the springs 561 are provided at the four locations, the force F4 acting on each of the springs 561 is equivalent to a quarter of the force F3 generated in the holding member 555, and is resultantly balanced with the force F1.

Further, the holding member 555 is a member capable of bending or warping as illustrated by arrow B in FIG. 17, and is formed as a plate spring. The holding member 555 is bent or warped by being pressed by the projecting portion 554a of the heat sink 554 and a force to push back the heat sink 554 in the Z2 direction is generated, with which it is possible to firmly keep the contact between the DMD 551 and the heat sink 554.

As described above, as to the movable unit 55, the movable plate 552 and the coupling plate 553 that includes the DMD 551 and the heat sink 554 are movably supported by the fixed unit 51. The position of the movable unit 55 is controlled by the movable unit controller 14. Further, the heat sink 554 in contact with the DMD 551 is provided in the movable unit 55, so that occurrence of troubles such as a malfunction and a failure caused by an increase of the temperature of the DMD 551 can be suppressed, in particular prevented.

(Shifting of Pixel)

As described above, in the image projection apparatus 1 according to the embodiment, the DMD 551 that generates a projection image is provided in the movable unit 55, and the position of the DMD 551 is controlled by the movable unit controller 14 together with the movable unit 55.

For example, the movable unit controller 14 controls the position of the movable unit 55 so as to move the movable unit 55 with a higher speed between a plurality of positions, which are apart from each other by a distance that is less than an arrangement interval of the micromirrors of the DMD 551 with a given cycle corresponding to a frame rate at the time of projecting images. When the movable unit 55 is moved (i.e., position of the DMD 551 is shifted), the system controller 10 generates a projection image based on the shifted position of the DMD 551, and transmits an image signal of the projection image to the DMD 551 via the DMD controller 13.

For example, the movable unit controller 14 reciprocally moves the DMD 551 with the given cycle between a position PA and a position PB, which are apart from each other by a distance that is less than an arrangement interval of the micromirrors of the DMD 551 in the X1-X2 direction and in the Y1-Y2 direction. At this timing, the DMD controller 13 controls the DMD 551 so as to generate a shifted projection image based on the shifted position of the DMD 551 so that a resolution of the projection image can be made about twice the resolution of the DMD 551.

With this configuration, the movable unit controller 14 moves the DMD 551 together with the movable unit 55 with the given cycle, and the DMD controller 13 controls the DMD 551 so as to generate the projection image based on the position of the DMD 551, with which the image having a resolution higher than a resolution of the DMD 551 can be projected.

Figure 18A:
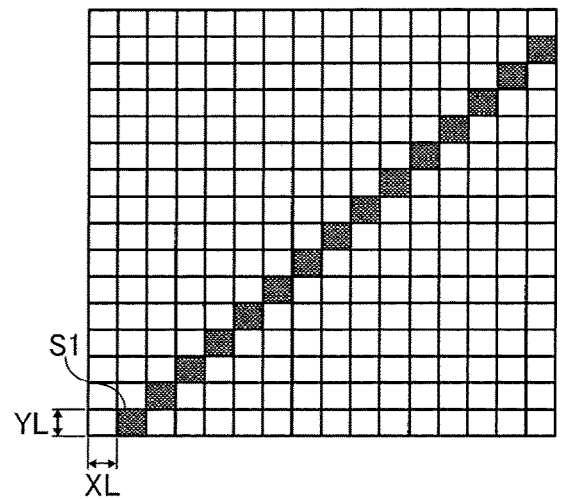
FIGS. 18A, 18B, and 18C illustrate an example of a display state of an image when pixels are shifted.
Figure 18B:
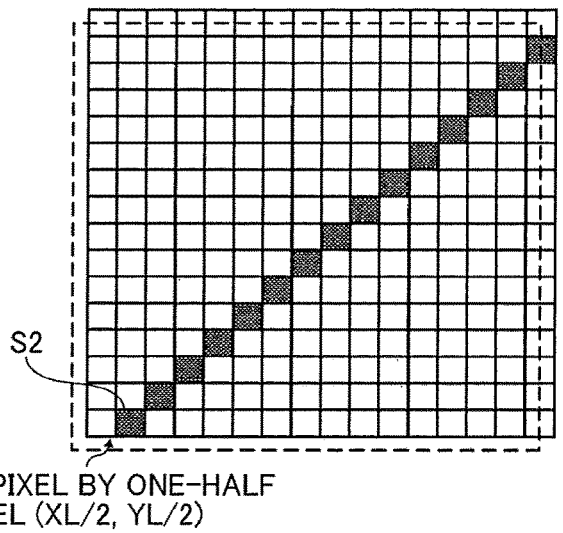
Figure 18C:
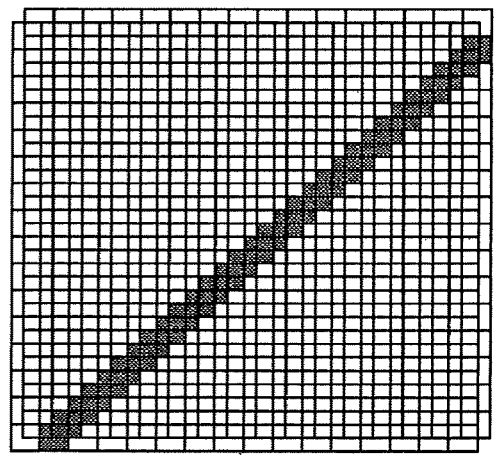

FIG. 18A, FIG. 18B, and FIG. 18C illustrate an example of a display state of an image when pixels are shifted by one-half pixel by performing the pixel-shift control operation or DMD-shift control operation.

FIG. 18A illustrates each pixel S1 in a state when the display position is not shifted (i.e., state before shifting, first position), and the size of each pixel is XL×YL. FIG. 18B illustrates each pixel S2 in a state (i.e., second position) shifted by one-half pixel (XL/2, YL/2) from the state of FIG. 18A. An operation mode that shifts pixels between two states in an oblique direction is referred to as a two-way shift operation. In this example case, the shift amount is set to one-half pixel, but the shift amount is not limited to one-half pixel.

Then, by combining the two images (FIGS. 18A and 18B), that is, alternately projecting the two images at each pixel, it is possible to achieve pseudo high resolution as illustrated in FIG. 18C. In this pixel-shift control operation, the system controller 10 generates two frames for an input video signal of one frame, in which the system controller 10 generates one frame at the first position (first frame) and another frame at the second position (second frame) for the input video signal of the one frame. Then, the movable unit controller 14 controls the movable unit 55 to shift the DMD 551 in the oblique direction, and the first frame and the second frame are projected with a state of shifting pixels for one-half pixel to achieve a higher resolution image as illustrated in FIG. 18C. For example, when an UHD image having image resolution of (4K, 3840×2160) is input, two FHD images having image resolution of (2K, 1920×1080) are generated and then the two images are alternately switched and displayed by synchronizing the display switching timing and the shift timing of the pixels with each other.

(Mode Switching)

Hereinafter, in the embodiment, when the pixel-shift control operation is executed (when the pixel-shift control operation is set ON), it is referred to as "high resolution mode," and when the pixel-shift control operation is not executed (the pixel-Shift control operation is set OFF), it is referred to as "full high definition (HD) mode."

In the high resolution mode, the system controller 10 performs the image processing for the pixel-shift control operation on an input image signal (input image). Then, the system controller 10 synchronizes the image processing for the pixel-shift control operation with the operation of the movable unit 55 by the movable unit controller 14 to achieve higher image resolution. As to the image processing for the pixel-shift control operation, in addition to the processing for generating two images from one image as above described, the image processing for the pixel-shift control operation can include necessary correction processing. The image processing for the pixel-shift control operation can be performed by known or new image processing methods.

Figure 19:
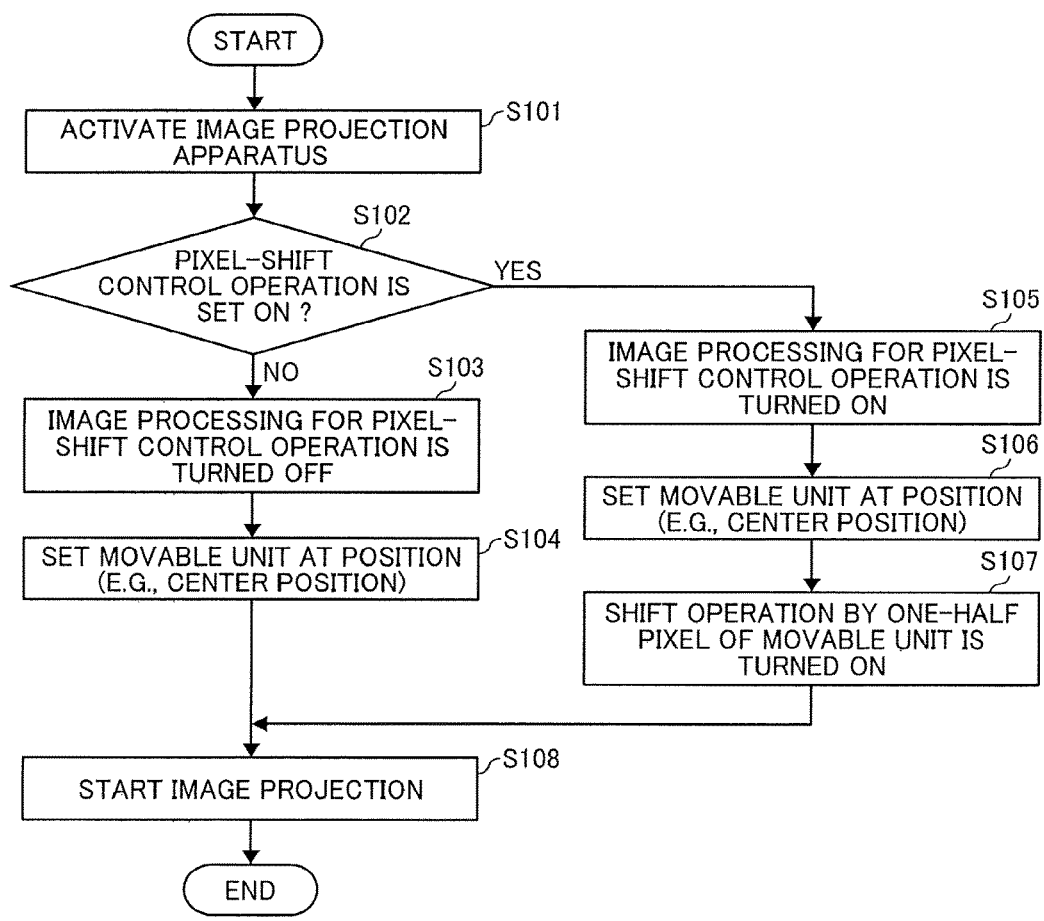
FIG. 19 is an example of a flow chart illustrating the steps of activation of an image projection apparatus and then starting a projection by the image projection apparatus.

FIG. 19 is an example of a flow chart illustrating the steps of activation of the image projection apparatus 1 and then starting a projection by the image projection apparatus 1. When the power of the image projection apparatus 1 is turned ON and the image projection apparatus 1 is activated (step S101), at first, it is determined whether the pixel-shift control operation is set ON or OFF based on the most-recent setting used for the most-recent operation (step S102).

When the pixel-shift control operation is set OFF (step S102: NO), the image processing for the pixel-shift control operation is turned OFF (step S103). Further, when the image projection apparatus 1 is activated, the power of the image generation unit 50 is also turned ON, and the movable unit 55 is set at a given position (e.g., center position) corresponding to a position when the pixel-shift control operation is not performed (step S104), in which the full HD mode is performed.

By contrast, when the pixel-shift control operation is set ON (step S102: YES), the image processing for the pixel-shift control operation is turned ON, and then an image processed by the image processing for the pixel-shift control operation is transmitted to the DMD 551 (step S105), in which the high resolution mode is performed.

Further, when the image projection apparatus 1 is activated, the power of the image generation unit 50 is also turned ON, and the movable unit 55 is set to an initial position (e.g., center position) for performing the pixel-shift control operation (step S106). From this initial position, the image generation unit 50 starts the pixel-shift control operation for the high resolution mode (step S107).

After completing the processing at S104 or S107 and completing a projection preparation, a projection of image is started (step S108). In this configuration, the projection of the input image is muted from the activation of the image projection apparatus 1 (step S101) until the start of projection by the image projection apparatus 1 (step S108), but an image such as a startup screen can be projected during steps 5101 to S108.

Figure 20:
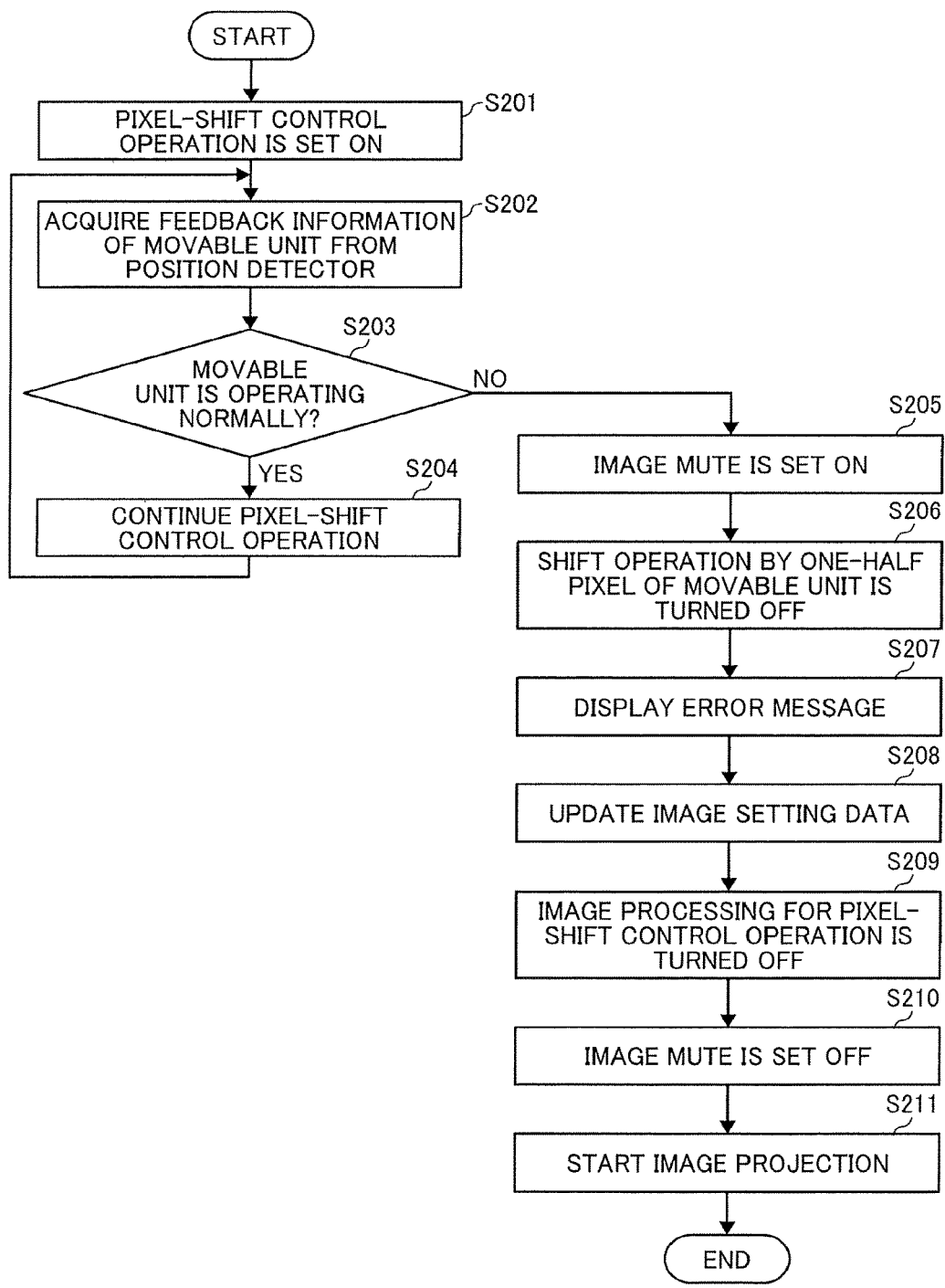
FIG. 20 is an example of a flow chart illustrating the steps of processing when a failure occurs during a pixel-shift control operation.

FIG. 20 is an example of a flow chart illustrating the steps of processing when a failure occurs in the movable unit 55 (i.e., error is detected) during the pixel-shift control operation.

When the high resolution mode is set (step S201), the movable unit controller 14 acquires a position detection result (feedback information) of the movable unit 55 from the position detector 52 (step S202). The position detector 52 can employ any type of position sensors such as a light sensor and a magnetic sensor as long as the position detector 52 can detect the movement of the movable unit 55 correctly.

The moving unit controller 14 determines whether the movable unit 55 operates normally based on the acquired feedback information (step S203). Specifically, when the position detection result of the movable unit 55 is at a target position, the moving unit controller 14 determines that the movable unit 55 operates normally (step S203: YES), and continues the pixel-shift control operation (step S204), and the sequence returns to S202. In this configuration, processes of S202 and S203 can be performed with a given cycle or interval.

By contrast, when the position detection result of the movable unit 55 is not at the target position, the moving unit controller 14 determines that some abnormality has occurred in the operation of the movable unit 55 (step S203: NO), and the moving unit controller 14 performs a mode switching operation from the high resolution mode to the full HD mode (steps S205 to S211).

In the mode switching operation, at first, an image mute processing is performed to stop the projection of the input image on the screen S (step S205) because if an image is projected during the mode switching operation, blurring of the image or the like occurs due to switching of image processing, and a user may see such image by feeling uncomfortableness or annoyance. The user does not see the image by stopping the projection of the image.

Then, the pixel-shift control operation is stopped (step S206). Specifically, the shift operation by one-half pixel of the movable unit 55 is stopped, and the movable unit 55 is set at a given position (e.g., center position) corresponding to the position when the pixel-shift control operation is not performed.

Then, a message of switching from the high resolution mode to the normal projection mode such as the full RD mode is projected on the screen S to inform a user (step S207), in which the message is displayed as error information because a trouble occurs to the high resolution function.

Then, the updating of image setting values is performed to set each of image setting values used for the high resolution mode to each of image setting values for the full HD mode (step S208). The image setting values are image setting data such as brightness, contrast, image position on screen, aspect ratio, trapezoid correction value, and the like.

If the image setting values set for the high resolution mode for projecting an image are different from the image setting values (default value or user setting value) set for the normal mode such as the full HD mode for projecting an image, and then the image setting values set for the high resolution mode are changed to the image setting values set for the full RD mode in advance when the mode is switched, difference in image perception becomes greater, with which a user (viewer) may feel uncomfortableness.

For this reason, in the process of updating the image setting data, the image setting values used for the high resolution mode are also used for the full HD mode. Specifically, when the high resolution mode is switched to the full HD mode, the image setting data is updated by setting the image setting values used for the high resolution mode are used for the full HD mode except some values such as the resolution of projection image of the high resolution mode or the like, with which difference in the image perception can be reduced, and a sense of uncomfortableness of the user (viewer) can be reduced. Further, the image setting values for the full HD mode are pre-set and stored in the non-volatile memory 26, and when the projection of the full HD mode is to be performed for a next time projection, an image is projected with the image setting values set for the full HD mode.

Then, the system controller 10 turns OFF the image processing for the pixel-shift control operation, and performs am image outputting control of the full HD mode (step S209). Then, the image mute is cancelled or set OFF (step S210), and the image projection under the full HD mode is started (step S210).

In conventional technologies, when the pixel-shift control operation cannot be operated normally due to occurrence of some kind of trouble or malfunction, images generated by performing the image processing for pixel shifting are not synchronized, and thereby the image quality of the projected image is deteriorated, and a viewer feels oddness, and thereby the images cannot be viewed normally.

By contrast, as to the image projection apparatus of the first embodiment, the image projection apparatus can detect whether the pixel-shift control is operated normally during the pixel-shift control operation. When the image projection apparatus detects abnormality during the pixel-shift control operation, the image processing for pixel shifting is stopped, and then the image is projected under the normal mode, with which deterioration of the image quality of the projected image can be suppressed, and thereby a user can continue to view the projected image using the image projecting apparatus without feeling uncomfortableness.

(Second Embodiment)

Hereinafter, a description is given of a second embodiment of the image projection apparatus according. The description of the same points as in the first embodiment will be omitted appropriately.

In the above-described first embodiment, the image projection apparatus 1 using a digital light processing (DLP) is described as an example of image projection apparatuses, but not limited to thereto. The present invention can be applied to any image projection apparatuses having configurations that can perform the pixel-shift control operation to achieve higher image resolution.

Further, in the above-described first embodiment, the pixel-shift control operation is performed by shifting the image generation element (e.g., DMD 551), but not limited thereto. For example, the pixel-shift control operation can be performed by moving or shifting a position of an optical element (e.g., one lens configuring an optical projection unit) disposed in a light path of the light emitted from the light source to generate an image such as intermediate image. For example, as to a projector of digital light processing (DLP) type, instead of performing the pixel-shift control operation of the image generation element, the pixel-shift control operation can be performed for an optical element disposed at a position after the image generation element.

In the second embodiment, an image projection apparatus of a liquid crystal type is described. FIG. 21 is an example of a functional block diagram of an image projection apparatus 1a of the second embodiment, in which the image projection apparatus 1a is a liquid crystal type image projection apparatus.

The image projection apparatus 1a of the second embodiment includes, for example, the light source 30 as a light source to emit light, a liquid crystal panel unit 70 as an image generation element to generate an image using the light emitted from the light source, a movable lens 72 as an optical element disposed at a position after the image generation element in a light path of the light emitted from the light source, a lens movement unit 75 as a shift unit to shift a position of the movable lens 72 used as the optical element, the system controller 10 as a projection control unit to control a projection of image by using a first mode that projects an image without shifting a position of the optical element by the shift unit, and a second mode that projects an image by shifting a position of the optical element by the shift unit, and a position detector 74 as a detector to detect whether the optical element operates normally. When the detector detects that the optical element does not operate normally under the second mode, the projection control unit stops image processing under the second mode, and switches the second mode to the first mode.

As illustrated in FIG. 21, the image projection apparatus 1a includes, for example, a system controller 10, a light source controller 11, a liquid crystal panel control unit 71, a movable lens control unit 73, a fan controller 15, a remote control signal receiver 22, a main operation unit 23, an input terminal 24, a video signal controller 25, a non-volatile memory 26, a power supply unit 27, a temperature sensor 28, a cooling fan unit 29, a light source 30, a liquid crystal panel unit 70, a movable lens 72, a position detector 74, a lens movement unit 75, and an optical projection unit 60 to project an image onto the screen S. The image projection apparatus 1a further includes, for example, a remote controller 21 as a remote control means or units. Hereinafter, points different from the image projection apparatus 1 described with reference to FIG. 5 is described. Further, the movable lens 72 is described as an example of an optical element in this specification.

The liquid crystal panel unit 70 includes, for example, liquid crystal panels of red, green, and blue (RGB), and the liquid crystal panel control unit 71 controls each of the liquid crystal panels to generate an image. The light emitted from the light source 30 to the liquid crystal panel unit 70 and reflected by the liquid crystal panel unit 70 is projected onto the movable lens 72. The movable lens 72 is disposed at a position after the liquid crystal panel unit 70 used as an image generation element in a light path of the light emitted from the light source 30. In this configuration, the lens movement unit 75 is provided as a shift unit for the movable lens 72 to move or shift a position of the movable lens 72. For example, the lens movement unit 75 employs, a piezoelectric element, an electromagnetic actuator, which is a combination of a voice coil and a magnet, a motor, or the like. The lens movement unit 75 is controlled by the movable lens control unit 73. The movable lens control unit 73 controls the inclination of the movable lens 72 by using the lens movement unit 75 so that the projected image is shifted by one-half pixel.

Further, when operating the movable lens 72, the system controller 10 performs given image processing for the pixel-shift control operation for the input image signal, and synchronizes the input image signal with the operation of the movable lens 72 to enhance the resolution of projected images.

Further, the position of the movable lens 72 can be detected by the position detector 74 (position sensor) provided in the vicinity of the movable lens 72. The movable lens control unit 73 detects whether the movable lens 72 is at the target position or not based on a detection result of the position detector 74. Specifically, the movable lens control unit 73 detects whether the movable lens 72 operates normally or not, and inputs the determination result to the system controller 10. Further, the position detector 74 can employ any type of position sensors such as a light sensor as long as the position detector 74 can detect the movement of the movable lens 72 correctly.

Further, the image projection apparatus 1a has the high resolution mode which shifts the movable lens 72 with a given cycle, and a normal mode which does not shift the movable lens 72. When the image projection apparatus 1a detects that the shifting of the movable lens 72 is not being operated normally under the high resolution mode, the image processing for the high resolution mode is stopped, and the mode is switched to the normal mode as same as the first implementation.

As to the image projection apparatus 1a of the second embodiment, when the image projection apparatus 1a performs the pixel-shift control operation by shifting the movable lens 72, the image projection apparatus 1a can detect whether the pixel-shift control is operated normally. When abnormality is detected, the image processing for pixel shifting is stopped, and then the image is projected under the normal mode, with which deterioration of the image quality of the projected image can be suppressed, and thereby a user can continue to view the projected image using the image projecting apparatus 1a without feeling uncomfortableness.

When a failure or a malfunction occurs in the mechanism for the pixel shift control operation while the pixel shift control operation is performed for the image projection apparatus, the pixel shift control operation is stopped or becomes unstable, and thereby it can be assumed that the pixel shift control cannot be operated normally. If the image having processed by the pixel shift control operation is projected from the image projecting apparatus while the pixel shifting control is not operated normally, the image quality of the image projected onto the image deteriorates.

As to the above described embodiments, even if the pixel shifting control is not operated normally due to some reasons in the image projection apparatus, the deterioration of the image quality of the projected image can be suppressed.

Further, in the above embodiments, a horizontally placed projector is described as an example of the image projection apparatuses, but the above embodiment can be also applied to a vertically placed ultra-short focus type projector using an optical reflection.

Numerous additional modifications and variations for the modules, the units, and the image projection apparatuses are possible in light of the above teachings. It is therefore to be understood that within the scope of the appended claims, the description of present disclosure may be practiced otherwise than as specifically described herein. For example, elements and/or features of different examples and illustrative embodiments may be combined each other and/or substituted for each other within the scope of present disclosure and appended claims.

What is claimed is:

1. An image projection apparatus comprising:
an image generation element implemented by circuitry and configured to generate an image using light emitted from a light source;
a shift unit implemented by the circuitry and configured to shift a position of the image generation element with a given cycle;
a projection control unit implemented by the circuitry and configured to control projection of the image under a plurality of modes, the modes including a first mode in which the image is projected without shifting the position of the image generation element by the shift unit, and a second mode in which the image is projected while shifting the position of the image generation element by the shift unit; and
a detector implemented by the circuitry and configured to detect whether the image generation element operates normally by detecting a position of the shift unit,
wherein when the detector detects that the image generation element does not operate normally under the second mode, the projection control unit stops image processing being performed, and switches the second mode to the first mode.

2. The image projection apparatus of claim 1, wherein when the projection control unit stops the image processing performed under the second mode, and then switches the second mode to the first mode, the projection control unit projects an image under the first mode according to image setting data used for projecting the image under the second mode.

3. The image projection apparatus of claim 1, wherein the projection control unit stops a projection of the image on a projection face before the projection control unit stops the image processing being performed under the second mode, and resumes a projection of the image on the projection face after the projection control unit stops the image processing being performed under the second mode.

4. The image projection apparatus of claim 1, wherein when the projection control unit stops the image processing being performed under the second mode, the projection control unit projects error information on a projection face.

5. An image projection apparatus comprising:
an image generation element to generate an image using light emitted from a light source;
an optical element disposed at a position after the image generation element in a light path of the light emitted from the light source;
a shift unit to shift the position of the optical element with a given cycle;
a projection control unit to control projection of the image under a plurality of modes, the modes including a first mode in which the image is projected without shifting the position of the optical element by the shift unit, and a second mode in which the image is projected while shifting the position of the optical element by the shift unit; and
a detector to detect whether the optical element operates normally by detecting a position of the shift unit,
wherein when the detector detects that the optical element does not operate normally under the second mode, the projection control unit stops image processing being performed, and switches the second mode to the first mode.

6. The image projection apparatus of claim 5, wherein when the projection control unit stops the image processing performed under the second mode, and then switches the second mode to the first mode, the projection control unit projects an image under the first mode according to image setting data used for projecting the image under the second mode.

7. The image projection apparatus of claim 5, wherein the projection control unit stops a projection of the image on a projection face before the projection control unit stops the image processing being performed under the second mode, and resumes a projection of the image on the projection face after the projection control unit stops the image processing being performed under the second mode.

8. The image projection apparatus of claim 5, wherein when the projection control unit stops the image processing being performed under the second mode, the projection control unit projects error information on a projection face.

9. A method of controlling image processing, comprising:
shifting a position of an image generation element of an image projection apparatus with a given cycle, the image generation element generating an image using light emitted from a light source;
controlling projection of the image under a plurality of modes, the modes including a first mode in which the image is projected without shifting the position of the image generation element, and a second mode in which the image is projected while shifting the position of the image generation element;
detecting, based on a preset control process, whether the image generation element operates normally by detecting a position of the image generation element;
stopping image processing being performed under the second mode when the detecting step detects that the image generation element does not operate normally under the second mode; and
switching the second mode to the first mode after stopping the image processing performed under the second mode.

* * * * *